US009747636B2

(12) United States Patent
Rowan et al.

(10) Patent No.: US 9,747,636 B2
(45) Date of Patent: Aug. 29, 2017

(54) ENHANCING INFORMATION SECURITY USING AN INFORMATION PASSPORT DASHBOARD

(71) Applicant: Bank of America Corporation, Charlotte, NC (US)

(72) Inventors: Ryan David Rowan, Arlington Heights, IL (US); Ryan Peter Debraal, Chicago, IL (US); Joseph Patrick Shinlever, Mooresville, NC (US); Craig A. Froelich, Charlotte, NC (US); Mariana Aldama Gavilan, Charlotte, NC (US); Scott Hammet, Charlotte, NC (US); Staci Pihota, Yonkers, NY (US)

(73) Assignee: Bank of America Corporation, Charlotte, NC (US)

( * ) Notice: Subject to any disclaimer, the term of this patent is extended or adjusted under 35 U.S.C. 154(b) by 385 days.

(21) Appl. No.: 14/563,236

(22) Filed: Dec. 8, 2014

(65) Prior Publication Data

US 2016/0162141 A1    Jun. 9, 2016

(51) Int. Cl.
*G06Q 40/00* (2012.01)
*H04L 29/08* (2006.01)
(Continued)

(52) U.S. Cl.
CPC .......... *G06Q 40/00* (2013.01); *G06Q 10/105* (2013.01); *G09B 5/02* (2013.01); *G09B 19/00* (2013.01);
(Continued)

(58) Field of Classification Search
CPC .... G06F 3/0484; G06Q 40/00; G06Q 10/105; G09B 5/00; G09B 5/02; G09B 19/00;
(Continued)

(56) References Cited

U.S. PATENT DOCUMENTS

| 2007/0276675 | A1* | 11/2007 | Gabrick | G06Q 10/10 705/310 |
| 2010/0110927 | A1* | 5/2010 | Cermak | H04L 67/04 370/252 |

(Continued)

*Primary Examiner* — Jennifer To
*Assistant Examiner* — Terri Filosi
(74) *Attorney, Agent, or Firm* — Banner & Witcoff, Ltd.; Michael A. Springs

(57) ABSTRACT

Methods, systems, and computer-readable media for enhancing information security using an information passport dashboard are presented. In one or more embodiments, a computing platform may receive, from a user computing device, a request for an information passport dashboard. Subsequently, the computing platform may load a listing of available dashboard content items from an information passport database. Then, the computing platform may select content items from the listing of available dashboard content items to promote one or more content items to the user of the user computing device based on user preferences information and further based on aggregate usage information. Thereafter, the computing platform may generate an information passport dashboard interface that includes information identifying the content items selected from the listing of available dashboard content items for the user of the user computing device. The computing platform then may send, to the user computing device, the information passport dashboard interface.

17 Claims, 37 Drawing Sheets

(51) Int. Cl.
    *G06Q 10/10*     (2012.01)
    *G09B 5/02*     (2006.01)
    *G09B 19/00*     (2006.01)

(52) U.S. Cl.
    CPC .............. *H04L 67/10* (2013.01); *H04L 67/22* (2013.01); *H04L 67/306* (2013.01)

(58) Field of Classification Search
    CPC ......... H04L 29/08; H04L 67/10; H04L 67/22; H04L 67/306
    USPC ........................................................ 715/747
    See application file for complete search history.

(56) References Cited

U.S. PATENT DOCUMENTS

| | | | |
|---|---|---|---|
| 2012/0198511 A1* | 8/2012 | Sarferaz | H04L 63/0263 726/1 |
| 2014/0040998 A1* | 2/2014 | Hsieh | G06F 3/01 726/5 |
| 2014/0188576 A1* | 7/2014 | de Oliveira | G06Q 10/06395 705/7.39 |
| 2015/0058153 A1 | 2/2015 | Tazian | |
| 2015/0058234 A1 | 2/2015 | Dozier | |
| 2015/0058324 A1 | 2/2015 | Kauwe | |
| 2015/0058345 A1 | 2/2015 | Mishra et al. | |
| 2015/0058412 A1 | 2/2015 | Hillerbrand | |
| 2015/0058731 A1 | 2/2015 | Marshall et al. | |
| 2015/0063634 A1 | 3/2015 | Hofman | |
| 2015/0063681 A1 | 3/2015 | Bhardwaj et al. | |
| 2015/0063688 A1 | 3/2015 | Bhardwaj et al. | |
| 2015/0063713 A1 | 3/2015 | Yang et al. | |
| 2015/0063714 A1 | 3/2015 | King et al. | |
| 2015/0065149 A1 | 3/2015 | Russell et al. | |
| 2015/0065357 A1 | 3/2015 | Fox | |
| 2015/0065362 A1 | 3/2015 | Gyorffy et al. | |
| 2015/0066466 A1 | 3/2015 | Chernyak et al. | |
| 2015/0066484 A1 | 3/2015 | Nathan et al. | |
| 2015/0066559 A1 | 3/2015 | Brouwer | |
| 2015/0066591 A1 | 3/2015 | Chourey | |
| 2015/0066593 A1 | 3/2015 | Huang et al. | |
| 2015/0066594 A1 | 3/2015 | Li et al. | |
| 2015/0066602 A1 | 3/2015 | Windsor | |
| 2015/0066612 A1 | 3/2015 | Karpoff et al. | |
| 2015/0066716 A1 | 3/2015 | Shortridge | |
| 2015/0066838 A1 | 3/2015 | Orumchian et al. | |
| 2015/0066861 A1 | 3/2015 | Ritto et al. | |
| 2015/0066929 A1 | 3/2015 | Satzke et al. | |
| 2015/0067019 A1 | 3/2015 | Balko | |
| 2015/0067471 A1 | 3/2015 | Bhardwaj et al. | |
| 2015/0067811 A1 | 3/2015 | Agnew et al. | |
| 2015/0067866 A1 | 3/2015 | Ibatullin et al. | |
| 2015/0170192 A1* | 6/2015 | Santaella | G06Q 30/0227 705/14.3 |

\* cited by examiner

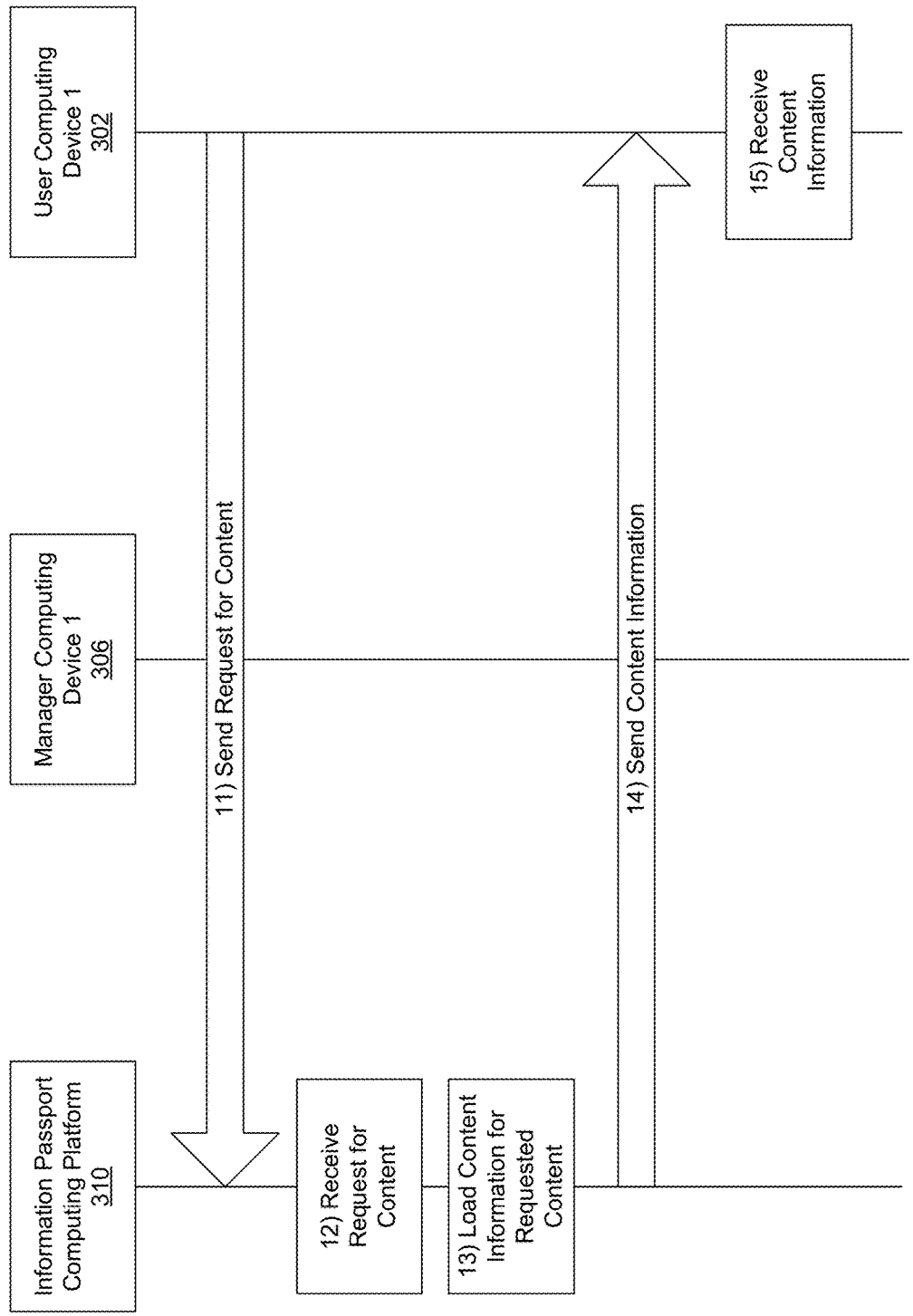

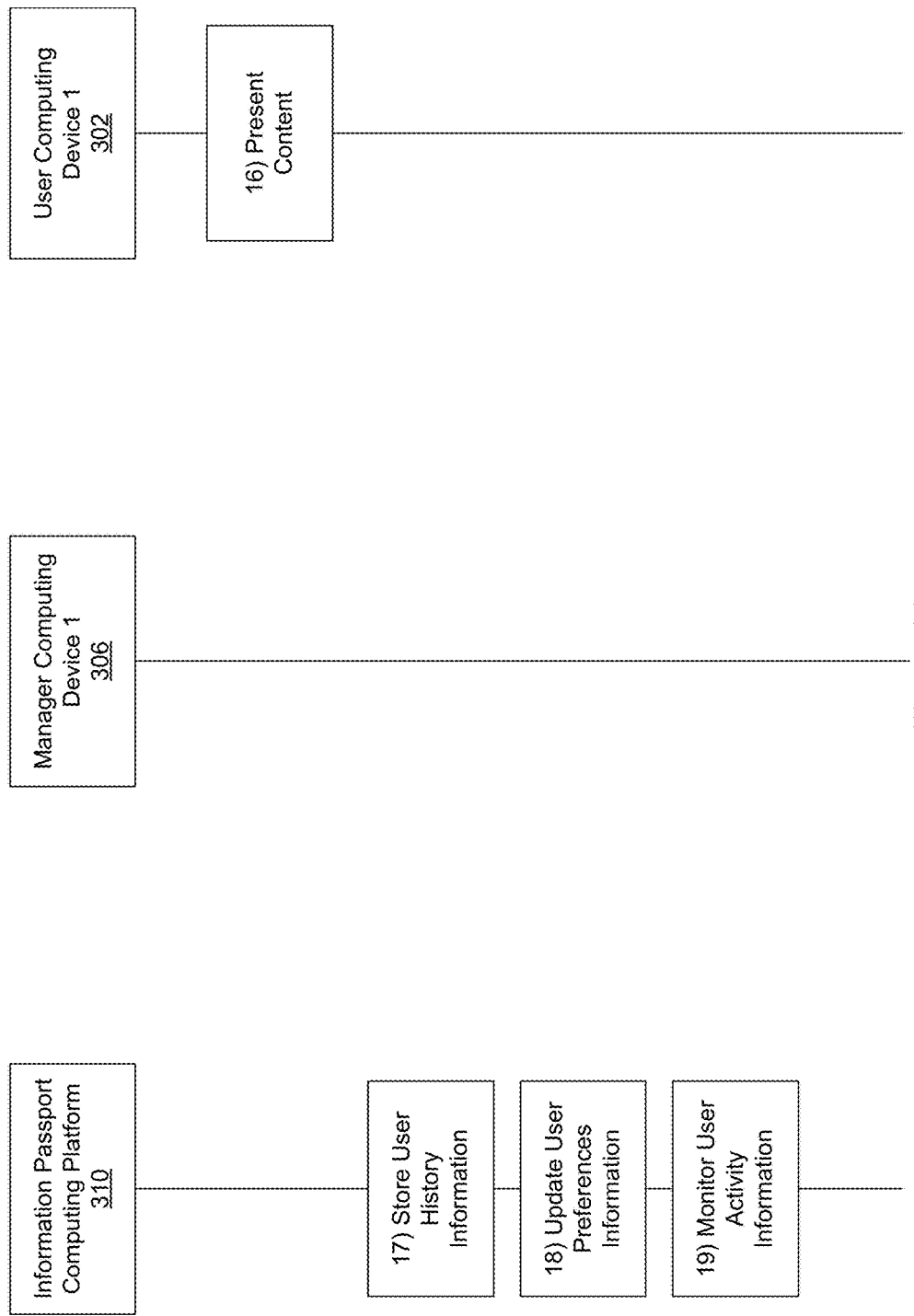

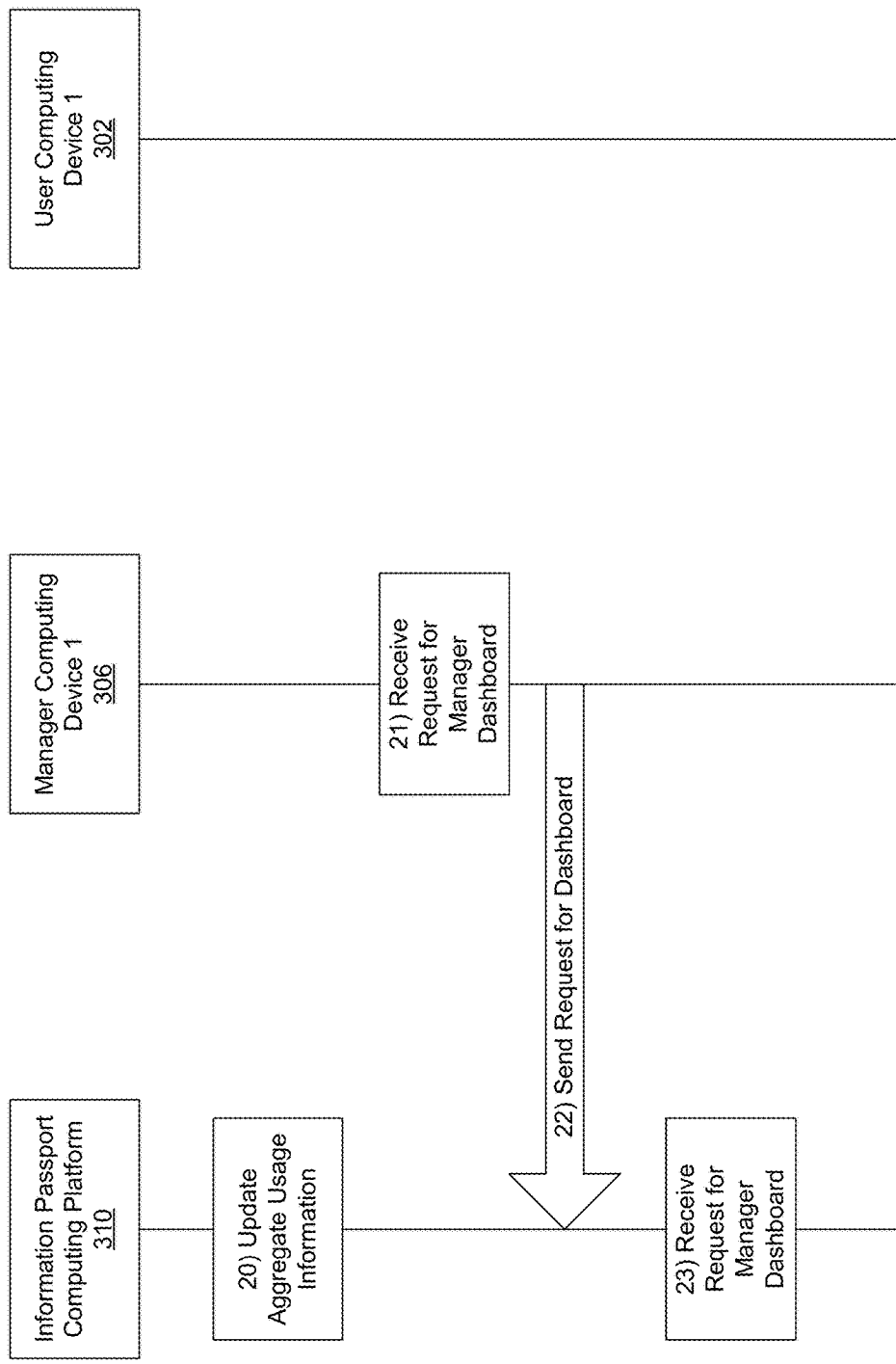

2900

Individual View
The Information Passport Individual View helps managers understand what risk level an associate poses to the bank. This is determined by collating a number of activities or access levels that are high risk.

| Individual | Team | Executive |

List populated w/ manager's team  ▼  Select the user you would like summarized data on.

[Team Member's Name] Risk Profile:

1 Exception (expand)

1 Recent Violation (expand)
03/04/2014 - NPI/Data Indexing

2 High Risk Entitlements (expand)
2 Devices (expand)
0 Info Pass Activities Complete (expand)
1 Failed Phishing Exercises (expand)
1 Failed Clean Desk Assessment (expand)

Access / Activity

Recommendations:
1. Ensure the associate completes the required training within Information Passport.
2. Request removal of any un-needed entitlements / exceptions.

DLP Exception Write Data (when applicable):

[Team Member Name]'s average write traffic is 50 files and this month they wrote 75 files to removable media.

Current Month
0 — 50 (6 Month User Average) — 75 — 100 click to see DLP write traffic

FIG. 29

ENHANCING INFORMATION SECURITY USING AN INFORMATION PASSPORT DASHBOARD

BACKGROUND

Aspects of the disclosure relate to computer hardware and software. In particular, one or more aspects of the disclosure generally relate to computer hardware and software for enhancing information security using an information passport dashboard.

Large organizations, such as financial institutions, may serve many customers and may have many employees, contractors, and other affiliates who may help the organization in serving these customers. As a result, such organizations may have relatively large amounts of information, as well as different kinds of information, including sensitive customer information.

Protecting this customer information, along with the various other types of enterprise information that the organization has, may be very important to a large organization. In addition, educating employees, contractors, and affiliates about how to protect such information may be an important and effective way of ensuring the safety and security of the information that the organization may possess.

While large organizations may take many steps to ensure the safety and security of information and to educate employees, contractors, or other affiliates on ways to protect such information, these organizations may wish to continue pursuing ever greater levels of safety and security in protecting information, particularly customer information.

SUMMARY

Aspects of the disclosure relate to various systems and techniques that provide effective, efficient, scalable, and convenient ways of enhancing the safety and security of information that an organization may possess, particularly in ways that can be used in educating employees, contractors, and other affiliates on best practices for handling information and information technology using an information passport dashboard.

For example, some aspects of the disclosure may provide an information passport dashboard in which users can engage in educational opportunities to improve their awareness and/or demonstrate their ability to minimize risk and maintain the safety and security of an organization's customers, clients, and employees. In some instances, the information passport dashboard may include an information security score that is specific to the user and that may increase (e.g., if the user completes activities and/or otherwise views particular content via the information passport dashboard) and/or may decrease (e.g., if the user incurs violations or has exceptions). In some arrangements, the score modeling may be static and/or predefined, such that one positive learning event may increase a user's score by a single point, while an exception may decrease the user's score by five points and a violation may decrease the user's score by ten points. As illustrated in greater detail below, the information passport dashboard may tie negative occurrences, such as exceptions and violations, to positive occurrences, such as the completion of learning activities, which counteract or cancel out the impact of negative occurrences on a particular user's information security score.

In other arrangements, the score modeling may be dynamic, such that relatively more impactful training courses that are available in the information passport dashboard may be dynamically weighted to have a relatively larger positive impact on a user's information security score, for instance. For example, as various training courses are completed by various users, a correlation and/or another analysis may be implemented to identify which specific training courses reduce the probability of a user incurring a violation. Subsequently, these specific training courses may be dynamically weighted to be worth a relatively larger number of points (e.g., two points, three points, and so on) than relatively less effective training courses. Over time, as more data is collected, the correlation and/or other analysis algorithm may be refined to ensure that the proper training courses are weighted relatively higher than other training courses.

Additionally or alternatively, the information passport dashboard may be configured to provide different types of learning events to different users, in line with the various learning preferences of different users. In some instances, the information passport dashboard may aggregate profile data for various users to dynamically present learning activities that a particular user may find most beneficial, such as learning activities in a format that are particularly well-suited for a particular user or type of user. For example, a relatively younger user may prefer shorter "burst" training sessions, while a relatively older user may prefer longer monolithic training sessions.

As illustrated below, by implementing various aspects of the disclosure, an organization may be able to optimize the way in which educational opportunities are provided to employees, contractors, and other affiliates, particularly in ways that may positively impact how the organization and its employees, contractors, and other affiliates manage information and ensure the safety and security of customer information and other types of information that the organization may possess.

In accordance with one or more embodiments, a computing platform (which may, e.g., incorporate one or more processors, memory, and/or communication interfaces, as discussed in greater detail below) may receive, via the communication interface, and from a user computing device, a request for an information passport dashboard for a user of the user computing device. Subsequently, the computing platform may load a listing of available dashboard content items for the user of the user computing device from an information passport database. Then, the computing platform may select content items from the listing of available dashboard content items for the user of the user computing device to promote one or more content items to the user of the user computing device based on user preferences information that is specific to the user of the user computing device and further based on aggregate usage information that is indicative of aggregate usage of content items included in the information passport database by one or more users different from the user of the user computing device. Thereafter, the computing platform may generate, for the user of the user computing device, an information passport dashboard interface that includes information identifying the content items selected from the listing of available dashboard content items for the user of the user computing device. The computing platform then may send, via the communication interface, and to the user computing device, the information passport dashboard interface.

In some embodiments, selecting the content items from the listing of available dashboard content items may include matching demographic information for the user of the user computing device with demographic trend information identifying one or more preferred content types for at least two different user groups to determine at least one preferred content type for the user of the user computing device. Additionally or alternatively, the user preferences information may identify at least one preferred content type of the user of the user computing device.

In some embodiments, the computing platform may receive, via the communication interface, and from the user computing device, a request to view a first content item. Subsequently, the computing platform may load content information for the first content item. Then, the computing platform may send, via the communication interface, and to the user computing device, the content information for the first content item.

In some instances, the computing platform may store user history information based on the request to view the first content item received from the user computing device. In addition, the computing platform may update the user preferences information that is specific to the user of the user computing device based on the user history information.

In some embodiments, the computing platform may monitor user activity information received from the user computing device. In addition, the computing platform may update the aggregate usage information based on the user activity information. In some instances, the aggregate usage information may be further updated based on additional user activity information received from one or more other computing devices different from the user computing device.

In some embodiments, the information passport dashboard interface may include a user information security score that is determined for the user of the user computing device based on user interaction with the information passport dashboard interface.

In some instances, the user information security score may be further determined based on violation information for the user of the user computing device. Additionally or alternatively, selecting the content items from the listing of available dashboard content items may include selecting at least one content item based on the violation information for the user of the user computing device. Additionally or alternatively, at least one point value of the at least one content item may be dynamically modified to incentivize the user of the user computing device to view the at least one content item.

In some instances, the user information security score may be further determined based on exception information for the user of the user computing device. Additionally or alternatively, selecting the content items from the listing of available dashboard content items may include selecting at least one content item based on the exception information for the user of the user computing device. Additionally or alternatively, at least one point value of the at least one content item may be dynamically modified to incentivize the user of the user computing device to view the at least one content item.

In some embodiments, the information passport dashboard interface may include at least one leaderboard interface. Additionally or alternatively, the information passport dashboard interface may include at least one violations interface. Additionally or alternatively, the information passport dashboard interface may include at least one manager interface.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4A-4F depict an illustrative event sequence for enhancing information security using an information passport dashboard in accordance with one or more example embodiments;

FIGS. 5-31 depict example graphical user interfaces for enhancing information security using an information passport dashboard in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
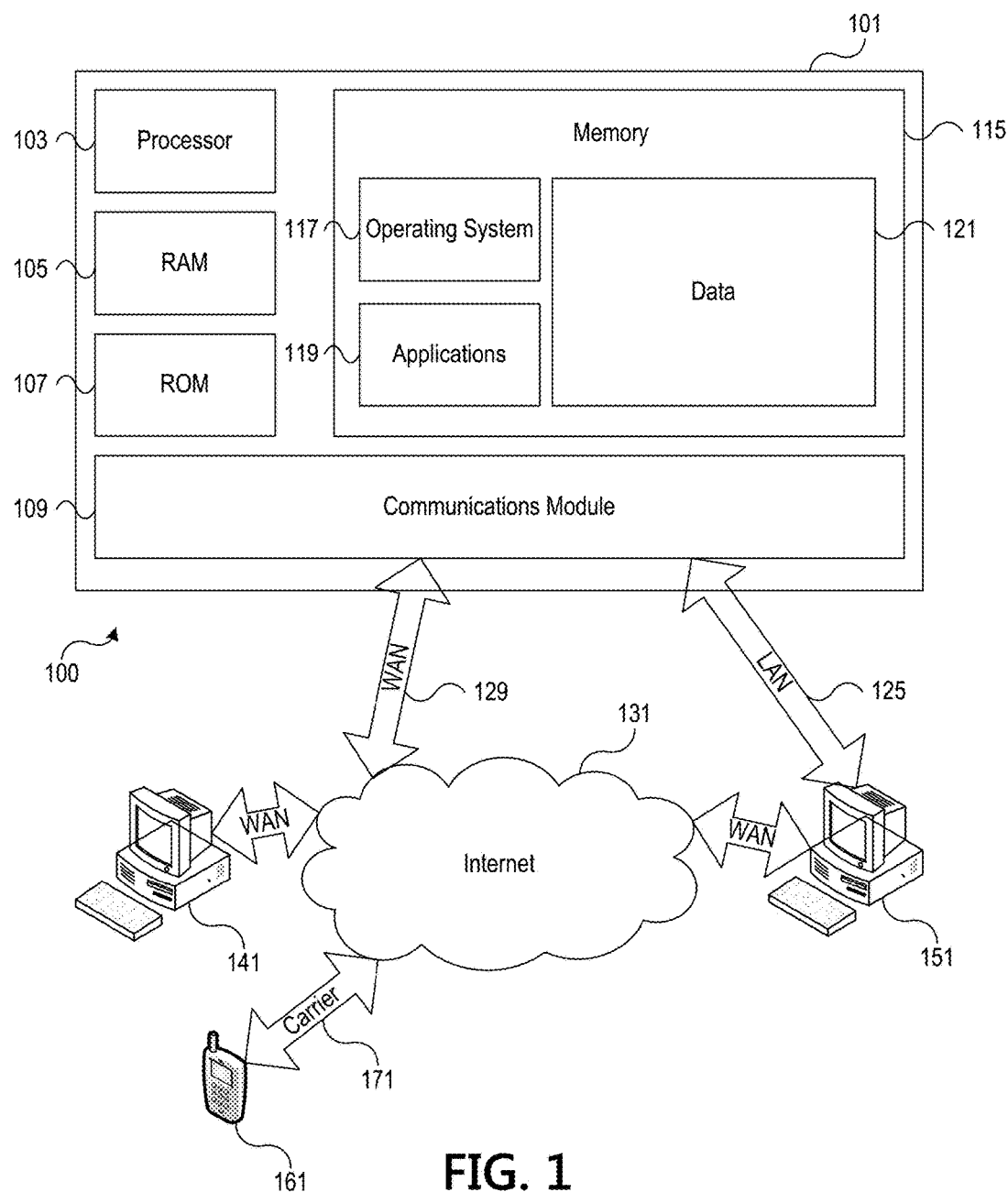
FIG. 1 depicts an illustrative operating environment in which various aspects of the disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks) are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
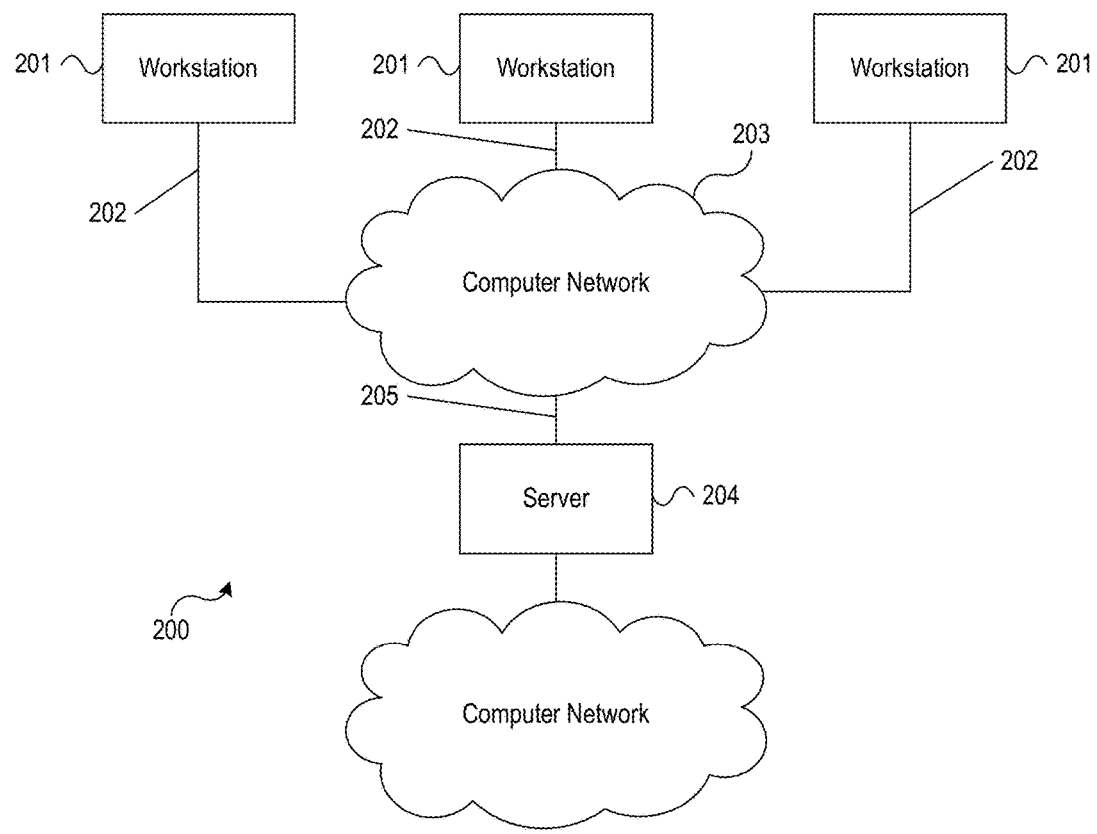
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
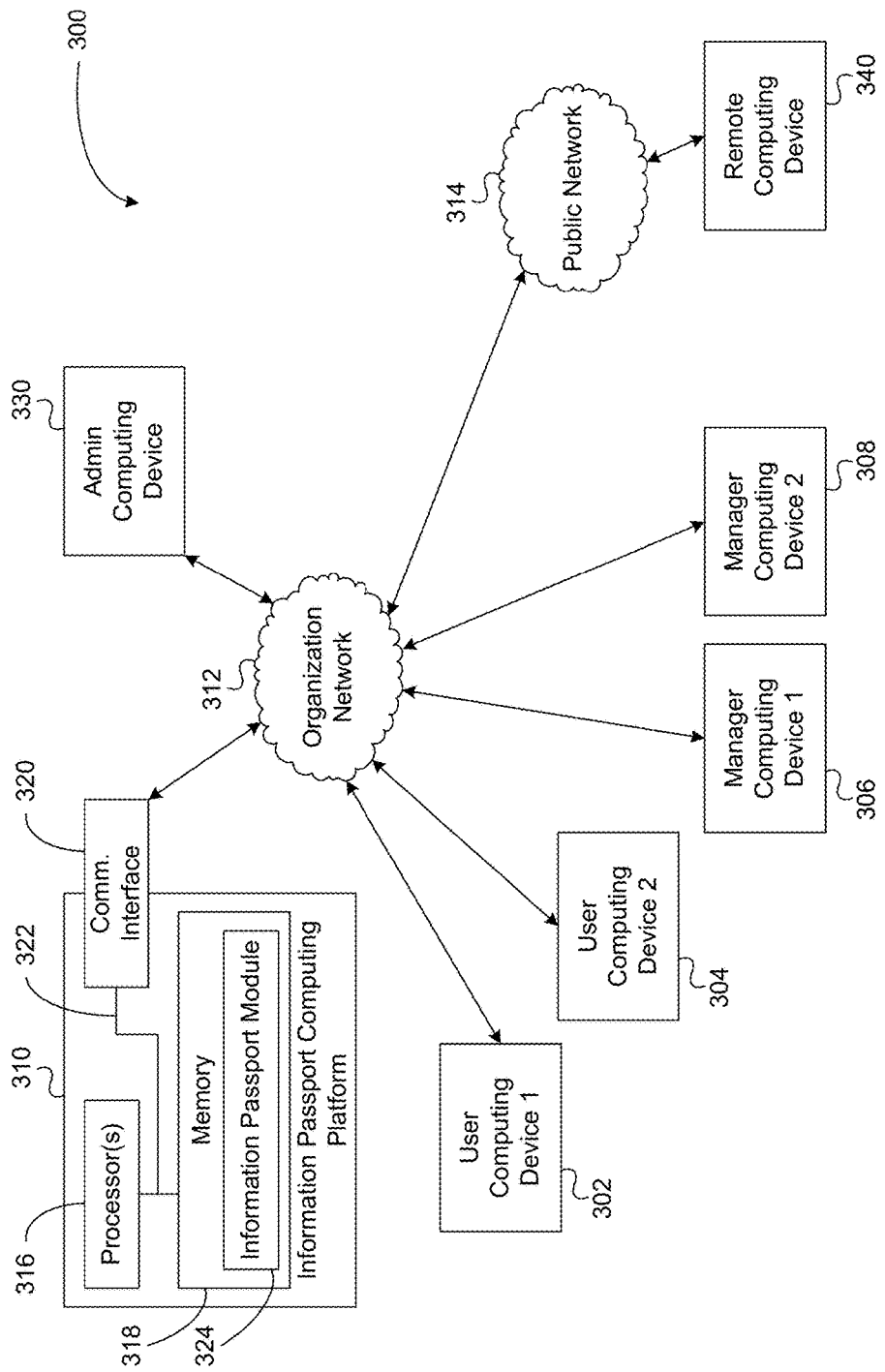
FIG. 3 depicts an illustrative computing environment for enhancing information security using an information passport dashboard in accordance with one or more example embodiments.

FIG. 3 depicts an illustrative computing environment for enhancing information security using an information passport dashboard in accordance with one or more example embodiments. Referring to FIG. 3, computing environment 300 may include one or more computing devices. For example, computing environment 300 may include a first user computing device 302 (which may, e.g., be used by a first employee, contractor, or other affiliate of an organization, such as a financial institution). Computing environment 300 also may include a second user computing device 304 (which may, e.g., be used by a second employee, contractor, or other affiliate of the organization different from the first employee, contractor, or other affiliate). Computing environment 300 also may include a first manager computing device 306 (which may, e.g., be used by a first manager in the organization). Computing environment 300 also may include a second manager computing device 308 (which may, e.g., be used by a second manager in the organization different from the first manager in the organization). Computing environment 300 also may include an administrative computing device 330 (which may, e.g., be used by and/or operated by an administrative user or other individual who may be associated with the organization and who may administer and/or otherwise control various computing devices and/or computer systems that are operated by and/or otherwise associated with the organization). Computing environment 300 also may include a remote computing device 340 (which may, e.g., be used by a third employee, contractor, or other affiliate of the organization different from the first employee, contractor, or other affiliate and the second employee, contractor, or other affiliate).

User computing device 302, user computing device 304, manager computing device 306, manager computing device 308, administrative computing device 330, and remote computing device 340 may be any type of computing device capable of receiving a user interface, receiving input via the user interface, and communicating the received input to one or more other computing devices. For example, user computing device 302, user computing device 304, manager computing device 306, manager computing device 308, administrative computing device 330, and remote computing device 340 may be a desktop computer, laptop computer, tablet computer, smart phone, or the like.

Computing environment 300 also may include one or more computing platforms. For example, computing environment 300 may include information passport computing platform 310. Information passport computing platform 310 may include one or more computing devices configured to perform one or more of the functions described herein. For example, information passport computing platform 310 may include one or more computers (e.g., laptop computers, desktop computers, servers, server blades, or the like).

Computing environment 300 also may include one or more networks, which may interconnect one or more of user computing device 302, user computing device 304, manager computing device 306, manager computing device 308, administrative computing device 330, remote computing device 340, and information passport computing platform 310. For example, computing environment 300 may include organization network 312 and public network 314. Organization network 312 and/or public network 314 may include one or more sub-networks (e.g., LANs, WANs, or the like). Organization network 312 may be associated with a particular organization (e.g., a corporation, financial institution, educational institution, governmental institution, or the like) and may interconnect one or more computing devices associated with the organization. For example, user computing device 302, user computing device 304, manager computing device 306, manager computing device 308, administrative computing device 330, and information passport computing platform 310 may be associated with an organization (e.g., a financial institution), and organization network 312 may be associated with and/or operated by the organization, and may include one or more networks (e.g., LANs, WANs, VPNs, or the like) that interconnect user computing device 302, user computing device 304, manager computing device 306, manager computing device 308, administrative computing device 330, and information passport computing platform 310 and one or more other computing devices and/or computer systems that are used by, operated by, and/or otherwise associated with the organization. Public network 314 may connect organization network 312 and/or one or more computing devices connected thereto (e.g., user computing device 302, user computing device 304, manager computing device 306, manager computing device 308, administrative computing device 330, and information passport computing platform 310) with one or more networks and/or computing devices that are not associated with the organization. For example, remote computing device 340 might not be associated with an organization that operates organization network 312, and public network 314 may include one or more networks (e.g., the Internet) that connect remote computing device 340 to organization network 312 and/or one or more computing devices connected thereto (e.g., user computing device 302, user computing device 304, manager computing device 306, manager computing device 308, administrative computing device 330, and information passport computing platform 310).

Information passport computing platform 310 may include one or more processor(s) 316, memory 318, communication interface 320, and data bus 322. Data bus 322 may interconnect processor(s) 316, memory 318, and/or communication interface 320. Communication interface 320 may be a network interface configured to support communication between information passport computing platform 310 and organization network 312, or one or more sub-networks thereof. Memory 318 may include one or more program modules comprising instructions that when executed by the processor(s) 316 cause information passport computing platform 310 to perform one or more functions described herein. For example, memory 318 may include information passport module 324, which may comprise instructions that when executed by processor(s) 316 cause information passport computing platform 310 to perform one or more functions described herein.

Figure 4A:
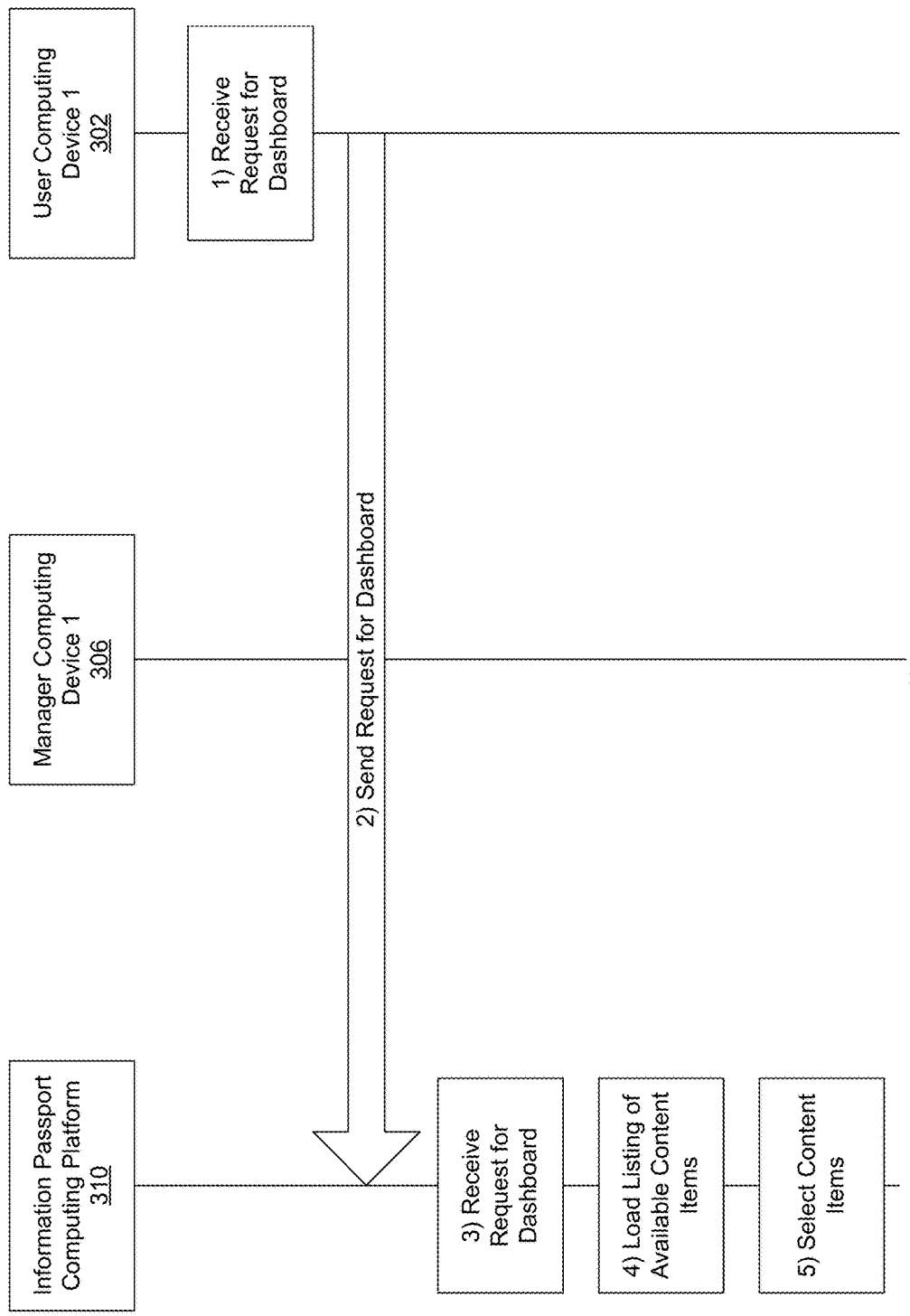

FIGS. 4A-4F depict an illustrative event sequence for enhancing information security using an information passport dashboard in accordance with one or more example embodiments. Referring to FIG. 4A, at step 1, user computing device 302 may receive a request for a dashboard. For example, at step 1, user computing device 302 may receive input from a user of user computing device 302 requesting to view and/or otherwise access an information passport dashboard. As illustrated in greater detail below, the information passport dashboard may include a graphical user interface and/or a collection of graphical user interfaces via which a user (e.g., the user of user computing device 302) can view, interact with, and/or otherwise access various content items. In one or more arrangements, the various content items that may be provided via the information passport dashboard may, for instance, be selected from an information passport database and may include articles, videos, games, and/or other types of content items that may be designed for and/or selected for one or more employees of a particular organization, such as a financial institution, in order to educate such employees about maintaining and improving information security.

At step 2, user computing device 302 may send a request for a dashboard to information passport computing platform 310. For example, based on receiving the request to view and/or otherwise access an information passport dashboard from a user, user computing device 302 may, at step 2, send a request to information passport computing platform 310 that requests one or more pages of and/or otherwise requests access to an information passport dashboard that may be provided by information passport computing platform 310 (e.g., to various computing devices associated with an organization and/or to various users of such computing devices).

At step 3, information passport computing platform 310 may receive the request for the dashboard from user computing device 302. For example, at step 3, information passport computing platform 310 may receive, via communication interface 320, and from user computing device 302, a request for an information passport dashboard for a user of user computing device 302. At step 4, information passport computing platform 310 may load a listing of available content items. For example, at step 4, information passport computing platform 310 may load a listing of available dashboard content items for the user of user computing device 302 from an information passport database. Such an information passport database may, for instance, be stored and/or maintained by information passport computing platform 310 and/or may be stored and/or maintained by one or more other computing devices that may be accessed by information passport computing platform 310.

At step 5, information passport computing platform 310 may select one or more content items. For example, at step 5, information passport computing platform 310 may select one or more content items from the listing of available dashboard content items for the user of user computing device 302 to promote one or more content items to the user of user computing device 302. For instance, information passport computing platform 310 may select content items to be promoted to the user of user computing device 302 based on user preferences information that is specific to the user of user computing device 302 and/or based on aggregate usage information that is indicative of aggregate usage of content items included in the information passport database by one or more users different from the user of user computing device 302, such as the user of user computing device 304 and/or one or more other users.

In some embodiments, selecting the content items from the listing of available dashboard content items may include matching demographic information for the user of the user computing device with demographic trend information identifying one or more preferred content types for at least two different user groups to determine at least one preferred content type for the user of the user computing device. For example, in selecting the content items from the listing of available dashboard content items, information passport computing platform 310 may match demographic information for the user of user computing device 302 with demographic trend information identifying one or more preferred content types for at least two different user groups to determine at least one preferred content type for the user of user computing device 302. Such demographic trend information may, for instance, identify a first preferred content type for a first user group (e.g., written article content as a preferred content type for a relatively older user group) and a second preferred content type for a second user group (e.g., video content and/or game content as a preferred content type for a relatively younger user group). In addition, the demographic information for the user of user computing device 302 may, for instance, include information identifying the age of the user of user computing device 302 and/or an age grouping of the user of user computing device 302, which may be used by information passport computing platform 310 in identifying and/or otherwise determining one or more preferred content types for the user of user computing device 302.

In some embodiments, the user preferences information may identify at least one preferred content type of the user of the user computing device. For example, the user preferences information (which may, e.g., be used by information passport computing platform 310 in selecting content items to be promoted and/or otherwise presented to the user of user computing device 302) may identify one or more content types that are preferred by the user of user computing device 302, such as written article content, video content, video game content, and/or one or more other types of content (which may, e.g., be included in and/or provided via the information passport dashboard).

Figure 4B:
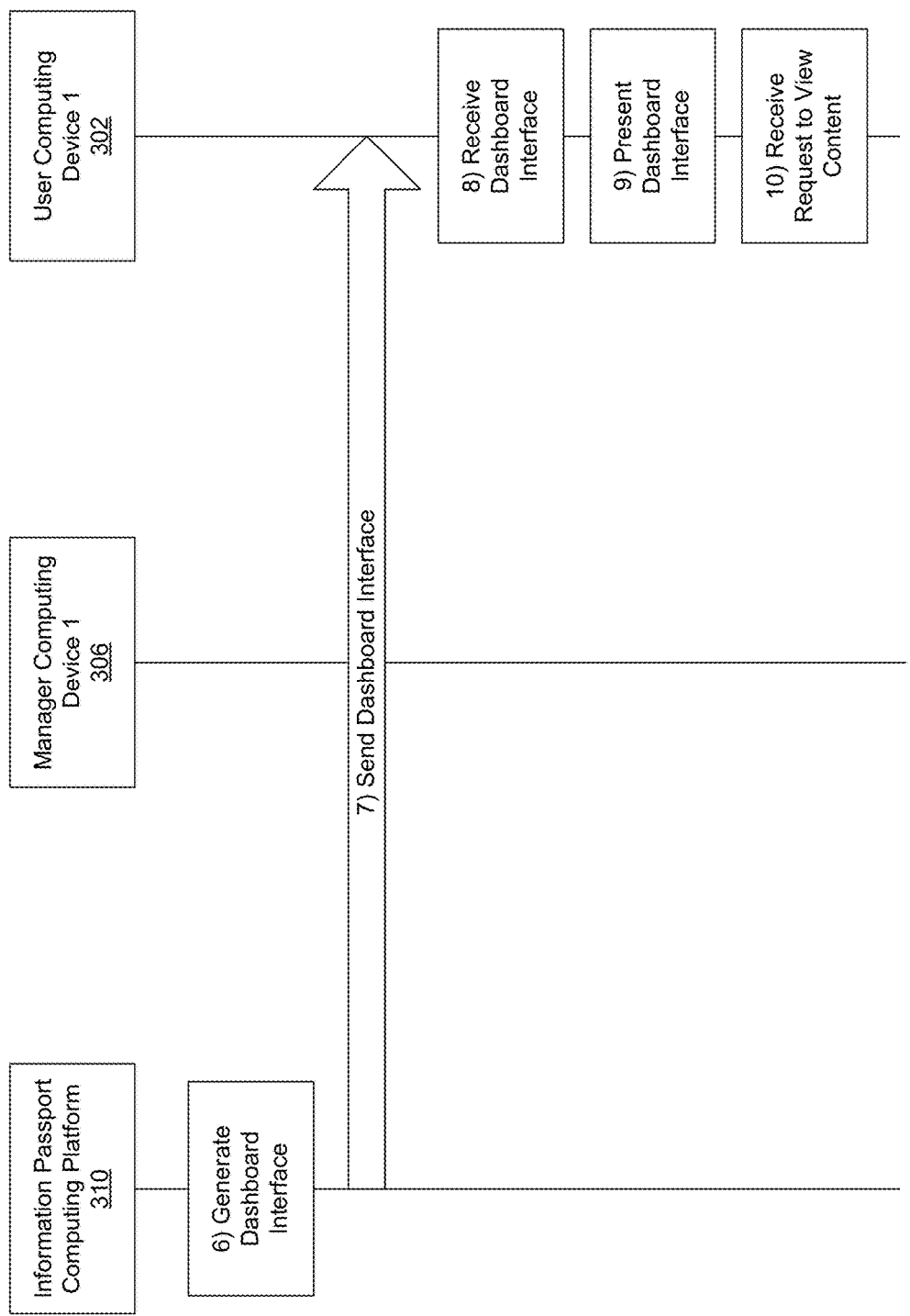

Referring to FIG. 4B, at step 6, information passport computing platform 310 may generate a dashboard interface. For example, at step 6, information passport computing platform 310 may generate, for the user of user computing device 302, an information passport dashboard interface that includes information identifying the content items selected from the listing of available dashboard content items for the user of user computing device 302. Such an information passport dashboard interface may include one or more graphical user interfaces, as discussed in greater detail below, and such graphical user interfaces may include information identifying the content items selected by information passport computing platform 310 from the listing of available dashboard content items and/or other information.

At step 7, information passport computing platform 310 may send the dashboard interface to user computing device 302. For example, at step 7, information passport computing platform 310 may send, via communication interface 320, and to user computing device 302, the information passport dashboard interface. At step 8, user computing device 302 may receive the dashboard interface from information passport computing platform 310. At step 9, user computing device 302 may present the dashboard interface. For example, at step 9, user computing device 302 may display, cause to be displayed, and/or otherwise present one or more graphical user interfaces that include information passport dashboard content, such as one or more of the example user interfaces illustrated in FIGS. 5-16.

Figure 5:
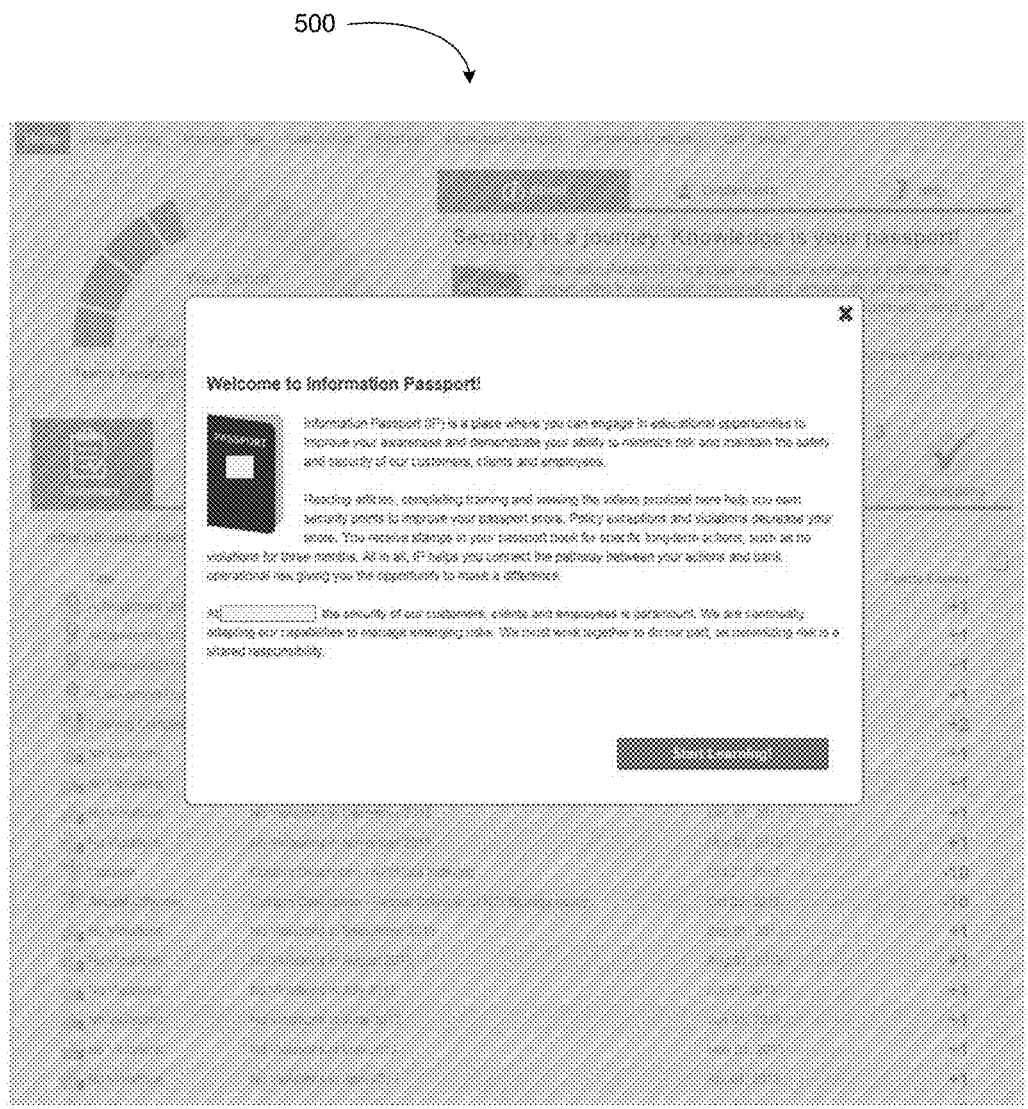
Figure 6:
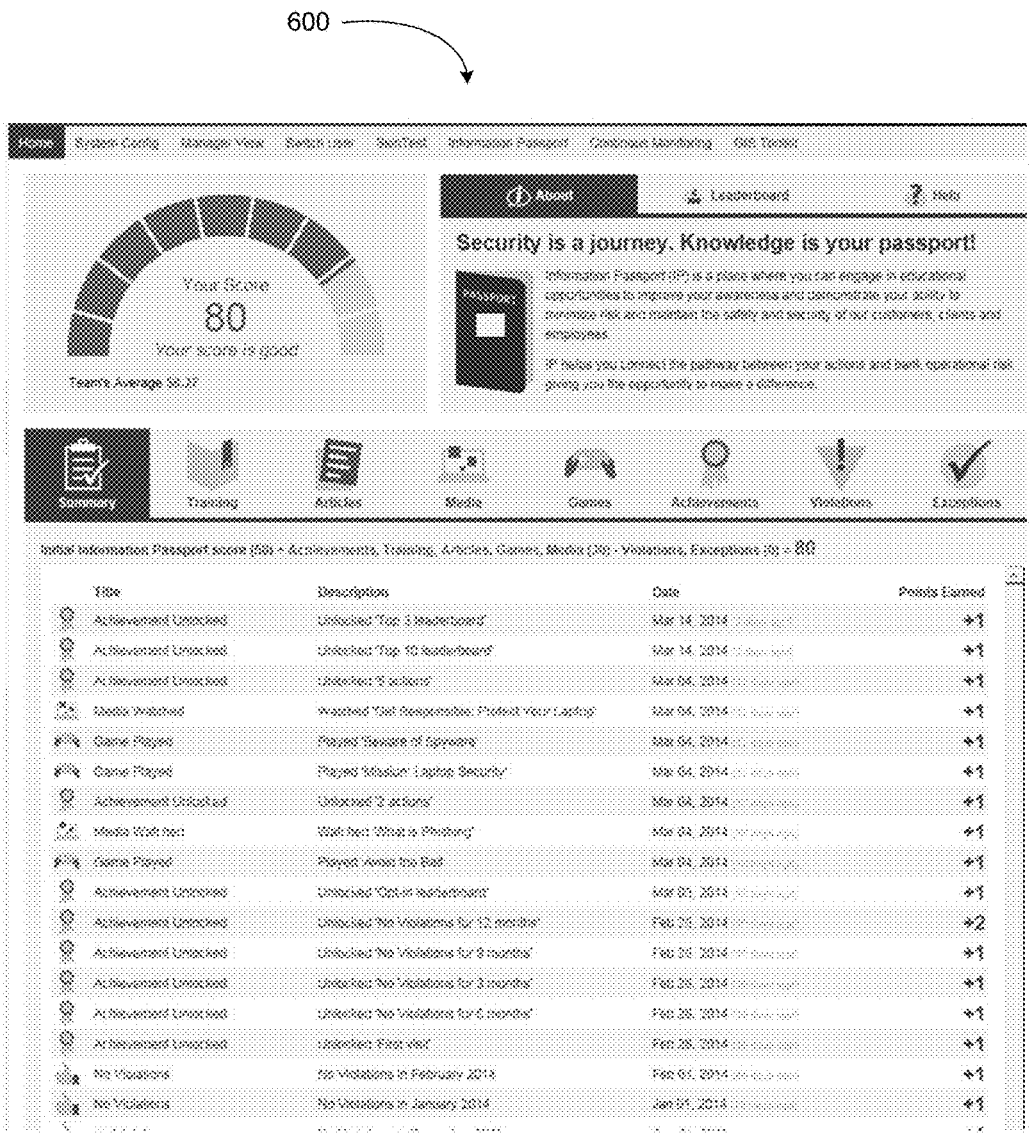
Figure 7:
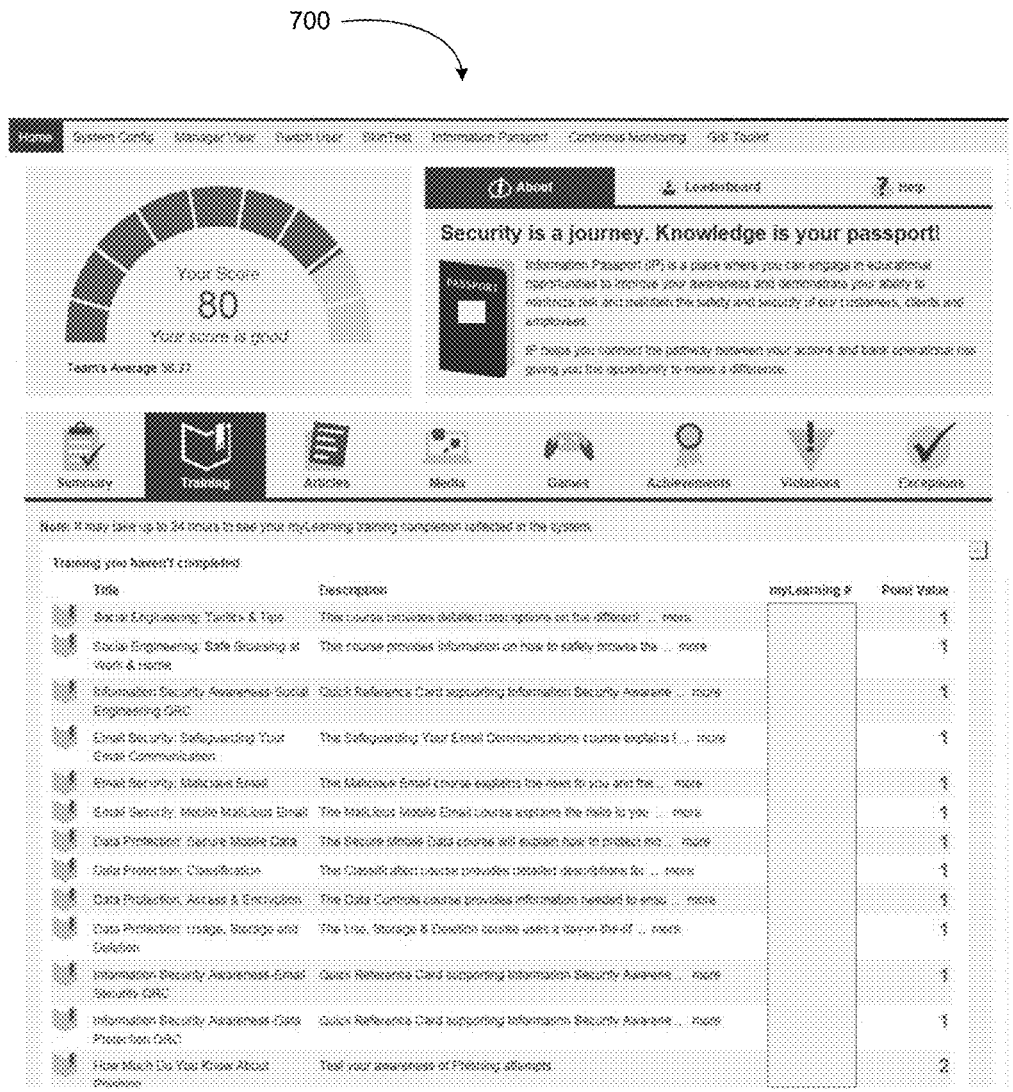
Figure 8:
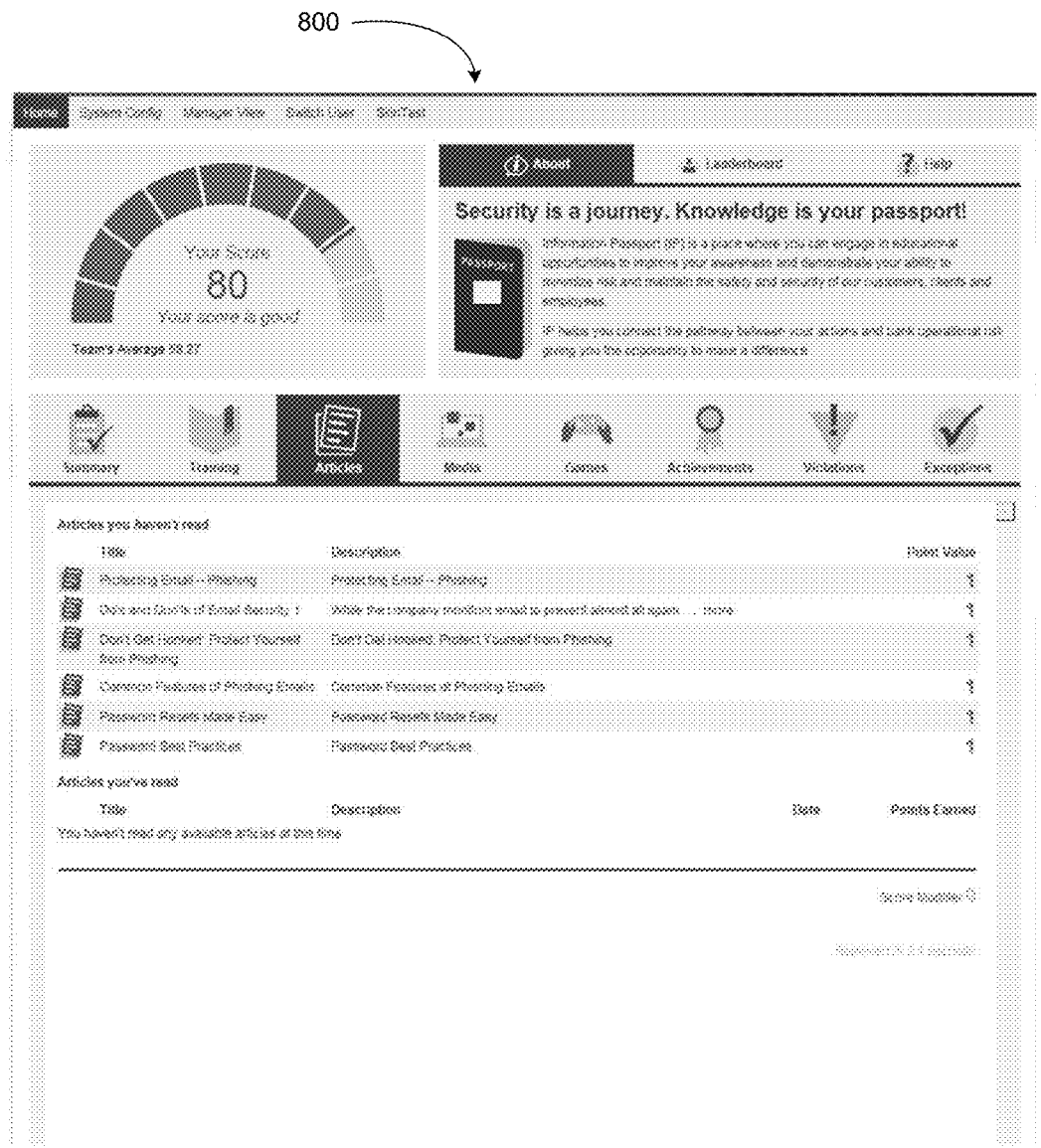
Figure 9:
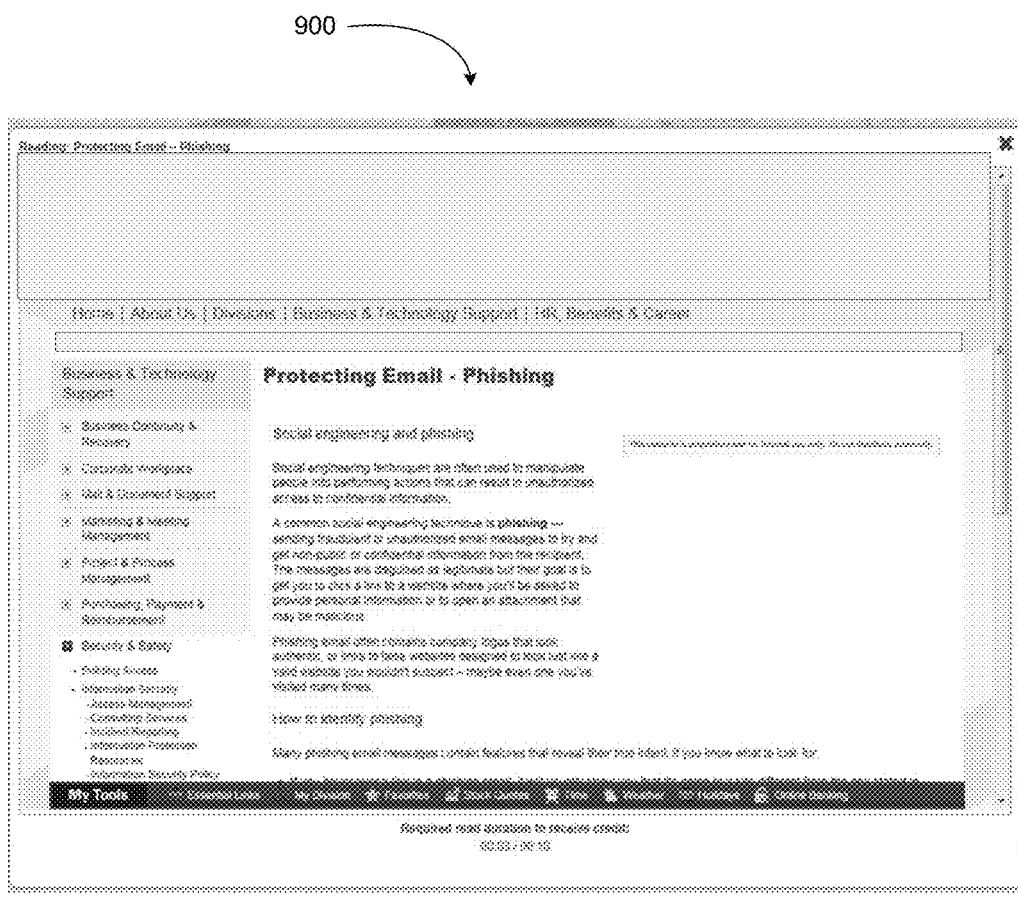

For example, user computing device 302 may display, cause to be displayed, and/or otherwise present a graphical user interface similar to graphical user interface 500, which is illustrated in FIG. 5. As seen in FIG. 5, graphical user interface 500 may include text and/or other information welcoming the user of user computing device 302 to an information passport dashboard interface and/or explaining what functions and/or information may be available via the information passport dashboard interface. Additionally or alternatively, user computing device 302 may display, cause to be displayed, and/or otherwise present a graphical user interface similar to graphical user interface 600, which is illustrated in FIG. 6. As seen in FIG. 6, graphical user interface 600 may include text and/or other information providing a summary view of the activity of the user of user computing device 302 in relation to the user's previous interactions with the information passport dashboard interface and/or information identifying how the user's activity affects an information security score of the user of user computing device 302. Additionally or alternatively, user computing device 302 may display, cause to be displayed, and/or otherwise present a graphical user interface similar to graphical user interface 700, which is illustrated in FIG. 7. As seen in FIG. 7, graphical user interface 700 may include text and/or other information identifying various training activities and/or content items that may be available via the information passport dashboard interface, such as the one or more content items that may, for instance, have been selected by information passport computing platform 310. Additionally or alternatively, user computing device 302 may display, cause to be displayed, and/or otherwise present a graphical user interface similar to graphical user interface 800, which is illustrated in FIG. 8. As seen in FIG. 8, graphical user interface 800 may include text and/or other information identifying various articles and/or other content items that may be available via the information passport dashboard interface. Additionally or alternatively, user computing device 302 may display, cause to be displayed, and/or otherwise present a graphical user interface similar to graphical user interface 900, which is illustrated in FIG. 9. As seen in FIG. 9, graphical user interface 900 may include text and/or other information associated with a particular content item (which, e.g., may have been selected for viewing by the user of user computing device 302, as discussed in greater detail below).

Figure 10:
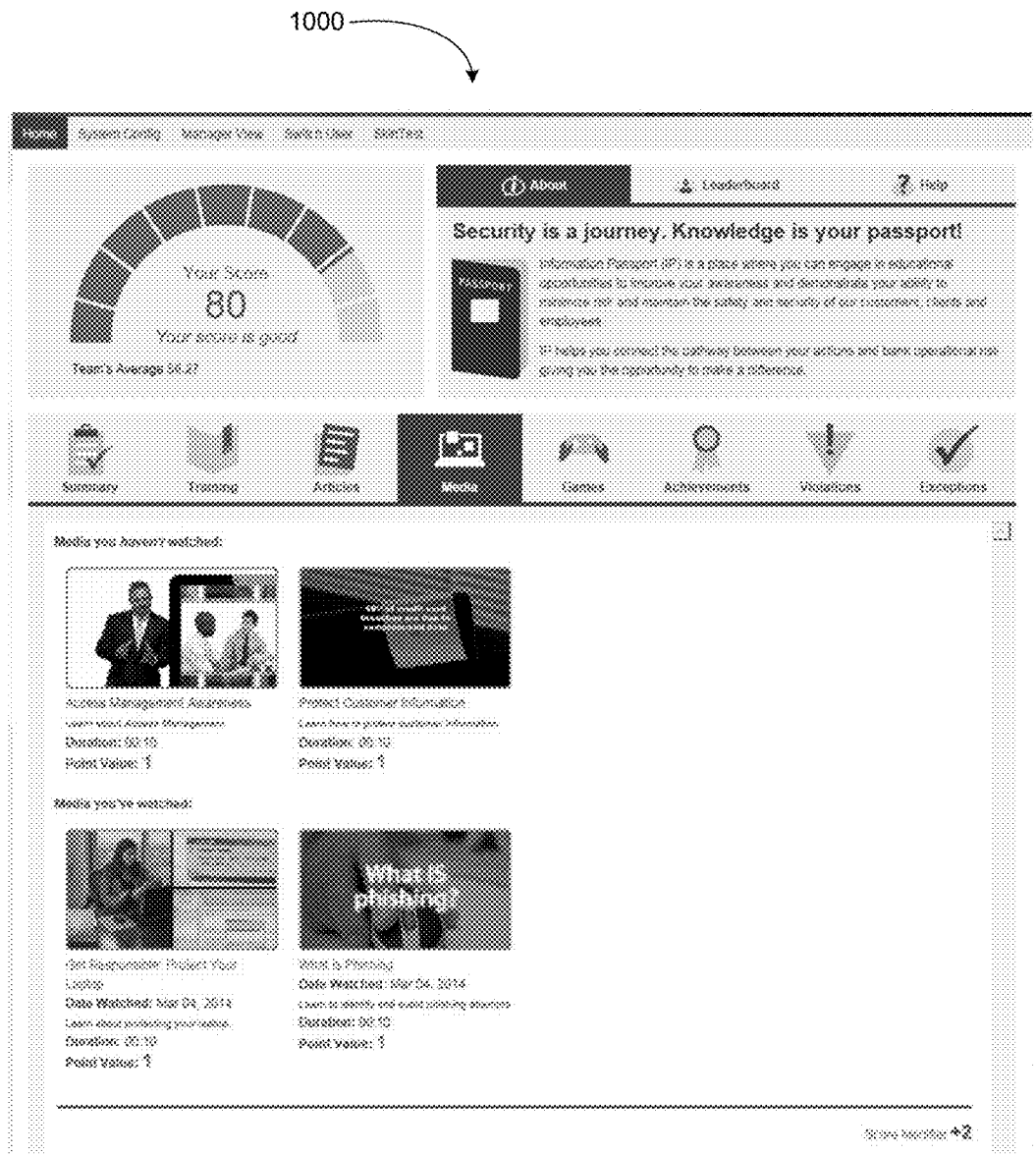
Figure 11:
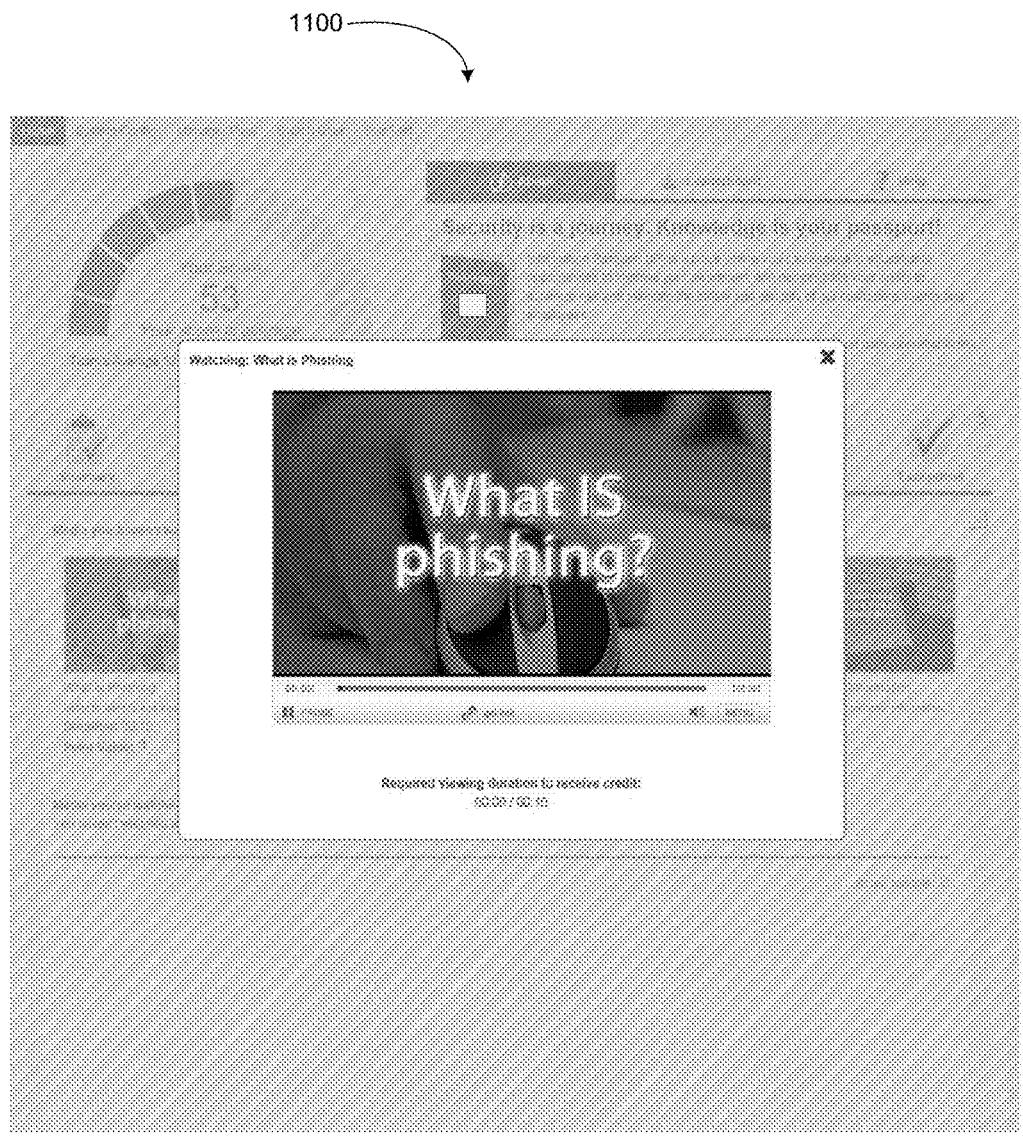
Figure 12:
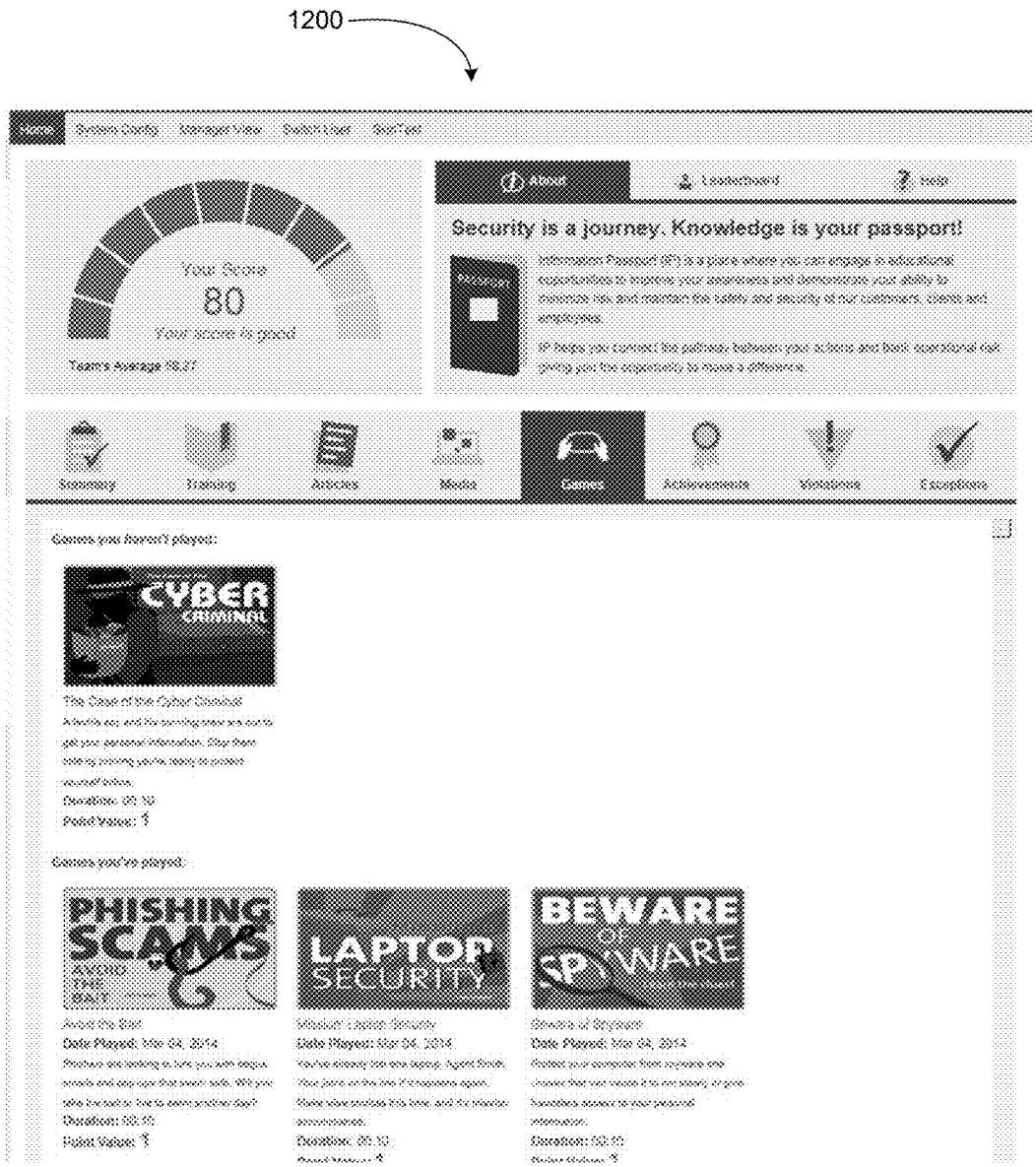
Figure 13:
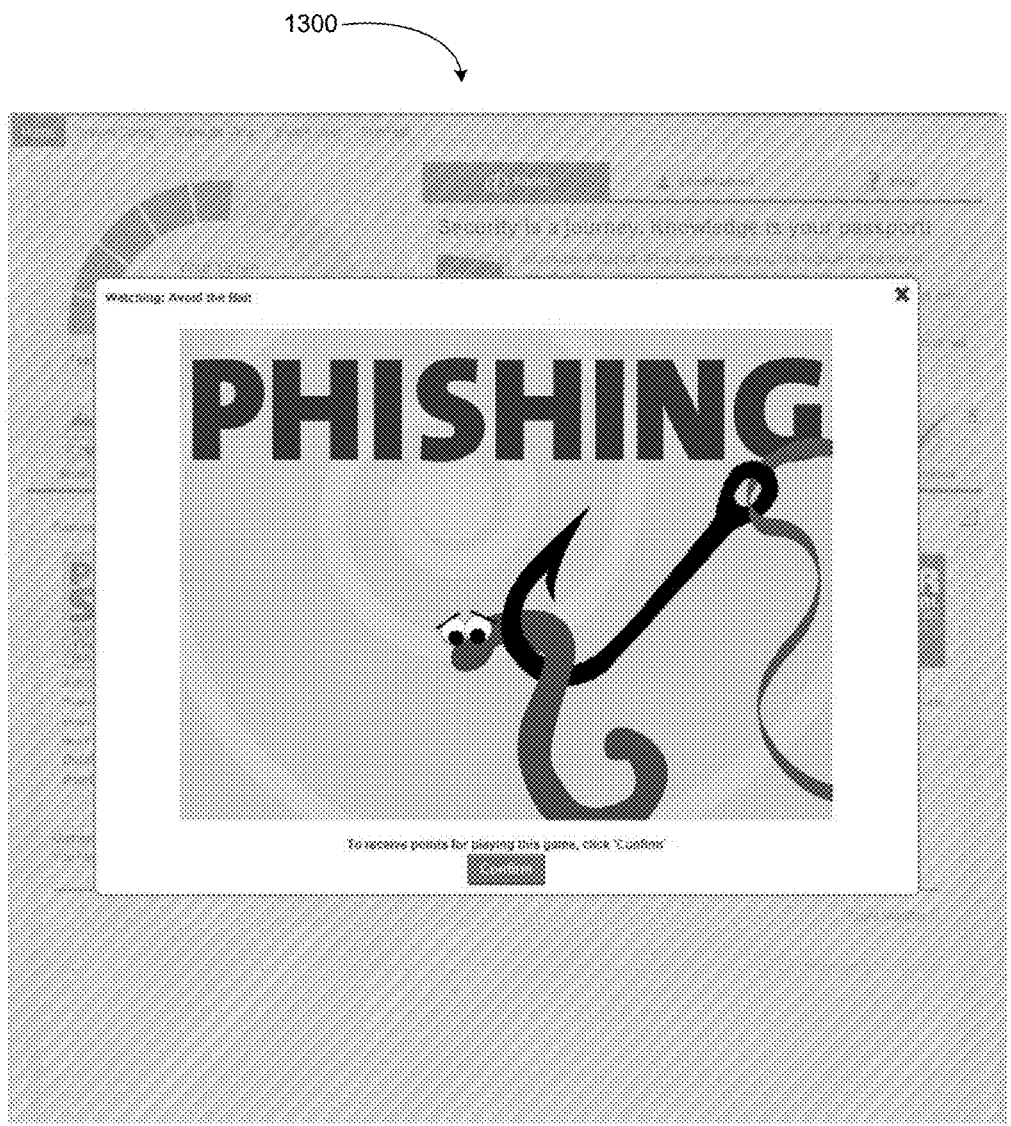

Additionally or alternatively, user computing device 302 may display, cause to be displayed, and/or otherwise present a graphical user interface similar to graphical user interface 1000, which is illustrated in FIG. 10. As seen in FIG. 10, graphical user interface 1000 may include text and/or other information identifying various media content and/or other content items that may be available via the information passport dashboard interface. Additionally or alternatively, user computing device 302 may display, cause to be displayed, and/or otherwise present a graphical user interface similar to graphical user interface 1100, which is illustrated in FIG. 11. As seen in FIG. 11, graphical user interface 1100 may include media content, text, and/or other information associated with a particular content item (which, e.g., may have been selected for viewing by the user of user computing device 302, as discussed in greater detail below). Additionally or alternatively, user computing device 302 may display, cause to be displayed, and/or otherwise present a graphical user interface similar to graphical user interface 1200, which is illustrated in FIG. 12. As seen in FIG. 12, graphical user interface 1200 may include text and/or other information identifying various games and/or other content items that may be available via the information passport dashboard interface. Additionally or alternatively, user computing device 302 may display, cause to be displayed, and/or otherwise present a graphical user interface similar to graphical user interface 1300, which is illustrated in FIG. 13. As seen in FIG. 13, graphical user interface 1300 may include game content, text, and/or other information associated with a particular content item (which, e.g., may have been selected for viewing by the user of user computing device 302, as discussed in greater detail below).

Figure 14:
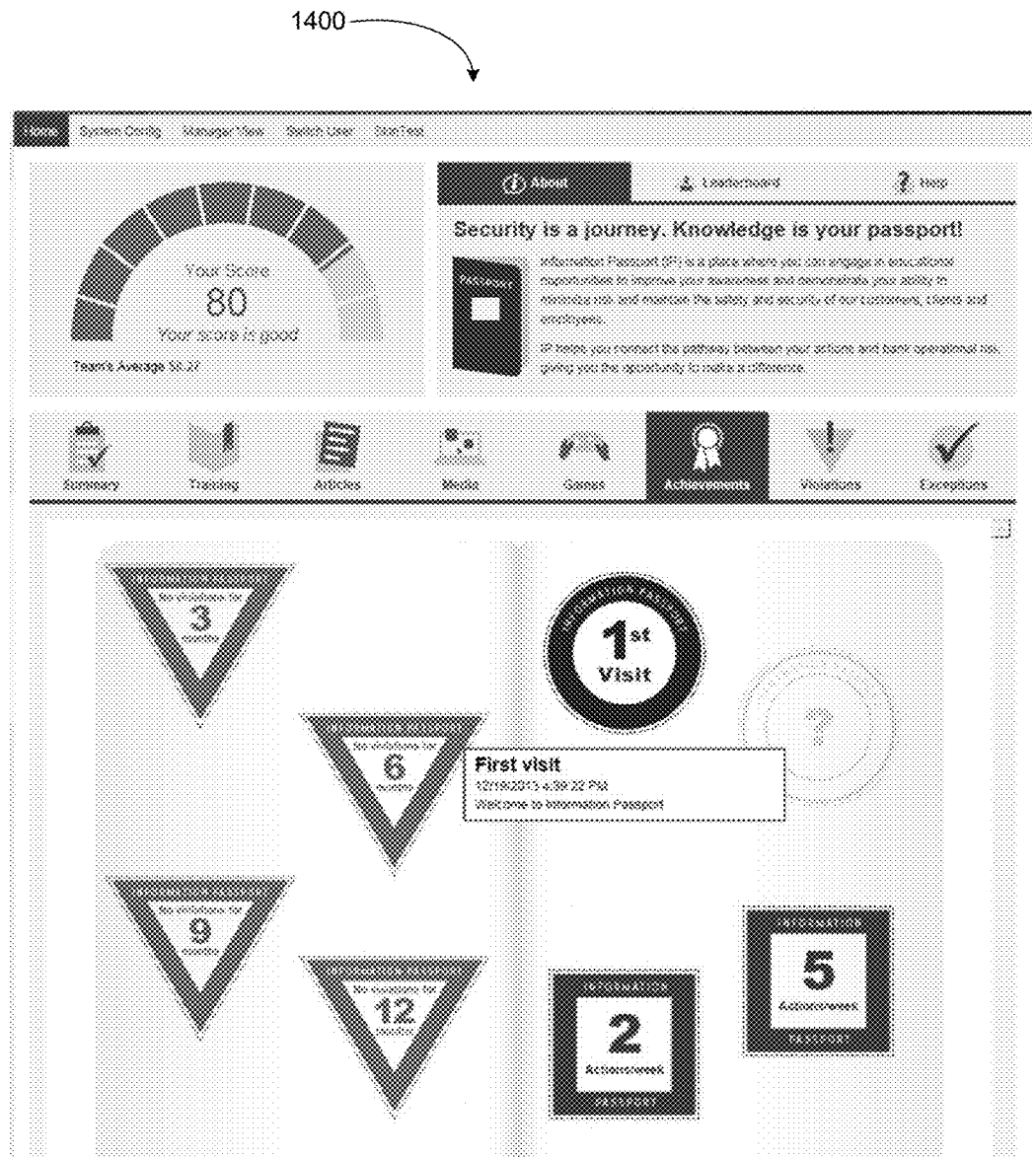
Figure 15:
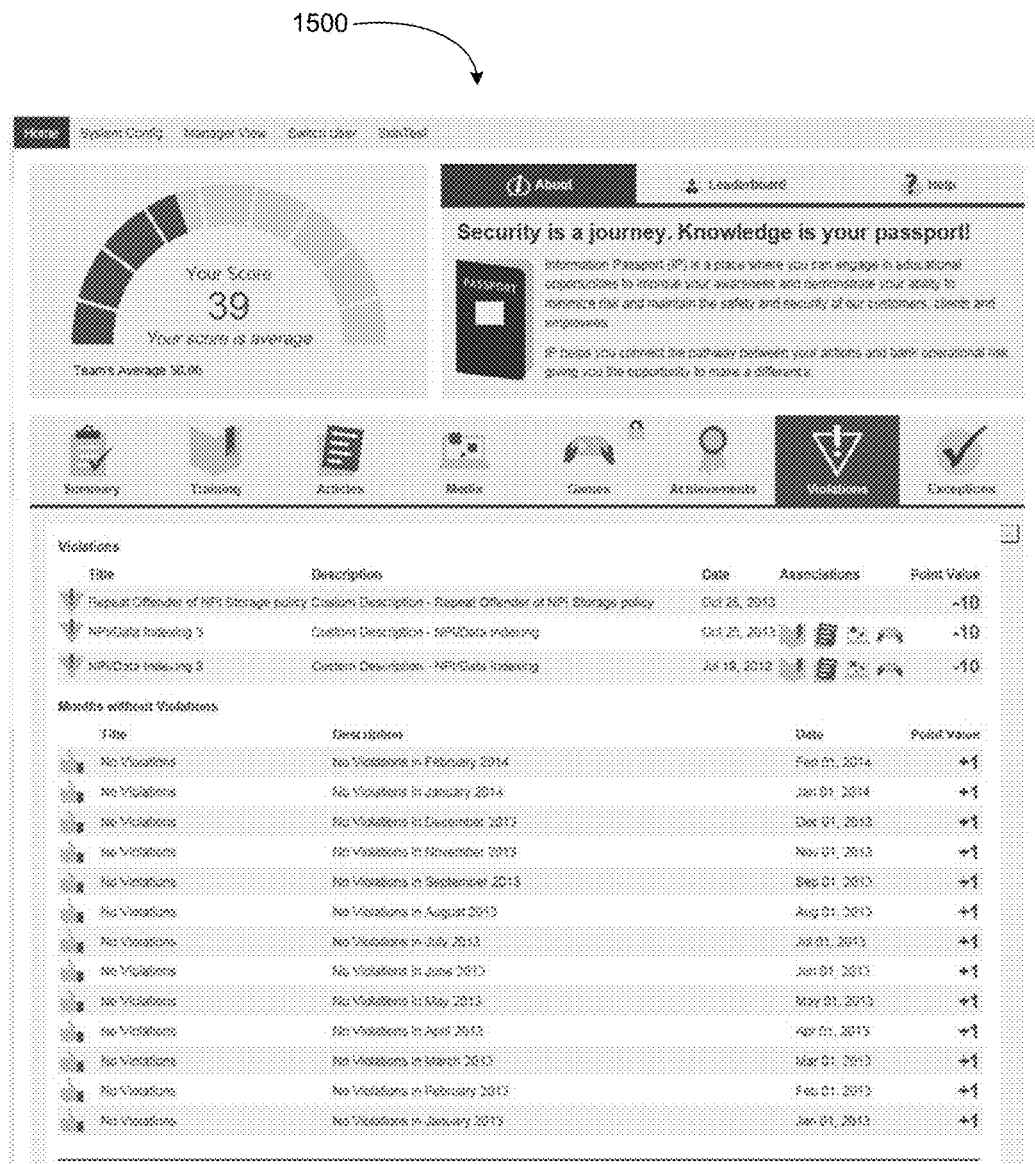
Figure 16:

Additionally or alternatively, user computing device 302 may display, cause to be displayed, and/or otherwise present a graphical user interface similar to graphical user interface 1400, which is illustrated in FIG. 14. As seen in FIG. 14, graphical user interface 1400 may include text and/or other information identifying various achievements that may have been accomplished, earned, and/or otherwise collected by the user of user computing device 302 in relation to the user's previous interactions with the information passport dashboard interface. Additionally or alternatively, user computing device 302 may display, cause to be displayed, and/or otherwise present a graphical user interface similar to graphical user interface 1500, which is illustrated in FIG. 15. As seen in FIG. 15, graphical user interface 1500 may include text and/or other information identifying various violations that may have been incurred by the user of user computing device 302 and/or other information identifying violation activity and/or status associated with the user of user computing device 302, such as information identifying how such violations affect an information security score of the user of user computing device 302. Additionally or alternatively, user computing device 302 may display, cause to be displayed, and/or otherwise present a graphical user interface similar to graphical user interface 1600, which is illustrated in FIG. 16. As seen in FIG. 16, graphical user interface 1600 may include text and/or other information identifying various exceptions that may be associated with the user of user computing device 302 and/or information identifying how such exceptions affect an information security score of the user of user computing device 302.

Referring again to FIG. 4B, at step 10, user computing device 302 may receive a request to view content. For example, at step 10, user computing device 302 may receive input from the user of user computing device 302 request to view a particular content item and/or otherwise interact with content and/or other information that may be included in and/or provided by the information passport dashboard interface (which may, e.g., have been displayed and/or otherwise presented by user computing device 302 at step 8 above).

Referring to FIG. 4C, at step 11, user computing device 302 may send a request for content to information passport computing platform 310. For example, at step 11, user computing device 302 may send a request for content to information passport computing platform 310 that includes a request for the particular content item and/or other information that may have been requested by the user of user computing device 302 at step 10.

At step 12, information passport computing platform 310 may receive the request for content. For example, at step 12, information passport computing platform 310 may receive, via communication interface 320, and from user computing device 302, a request to view a first content item. As noted above, the request may, for instance, identify a particular content item and/or other information that may have been requested by the user of user computing device 302. At step 13, information passport computing platform 310 may load content information for the requested content. For example, at step 13, information passport computing platform 310 may load content information for the first content item. Such content information may, for instance, include information specifying the contents of the content item. For instance, where the requested content item is a written article, the content information may include information specifying the text of the article and/or any associated image content. In instances where the requested content item is a media item or a video game, the content information may likewise include information specifying the media data and/or game data that may, for instance, be used by user computing device 302 in presenting the media item or video game to the user of user computing device 302. Additionally or alternatively, in loading the content information, information passport computing platform 310 may access, download, and/or store the content information for the requested content item from the information passport database (e.g., from which information passport computing platform 310 initially obtained the listing of available dashboard content items for the user of user computing device 302).

At step 14, information passport computing platform 310 may send the content information to user computing device 302. For example, at step 14, information passport computing platform 310 may send, via communication interface 320, and to user computing device 302, the content information for the first content item. At step 15, user computing device 302 may receive the content information from information passport computing platform 310.

Figure 23:

Referring to FIG. 4D, at step 16, user computing device 302 may present content. For example, at step 16, user computing device 302 may present content based on the content information received from information passport computing platform 310. In presenting the content, user computing device 302 may display, cause to be displayed, and/or otherwise present one or more graphical user interfaces that include the content and/or other information, such as one or more of the example user interfaces illustrated in FIG. 9, FIG. 11, and/or FIG. 13, as discussed above. In some instances, certain types of content, such as video game content, might be restricted such that the user of user computing device 302 might not be able to access and/or view the content if the user's information security score does not exceed a predefined threshold. In such instances, if a user attempts to access such restricted content and his or her information score is below the predefined threshold, user computing device 302 may present an error message. For example, user computing device 302 may display, cause to be displayed, and/or otherwise present a graphical user interface similar to graphical user interface 2300, which is illustrated in FIG. 23. As seen in FIG. 23, graphical user interface 2300 may include text and/or other information informing the user that the requested content is unavailable due to one or more restrictions.

Referring again to FIG. 4D, at step 17, information passport computing platform 310 may store user history information. For example, at step 17, information passport computing platform 310 may store user history information based on the request to view the first content item received from the user computing device. Such user history information may, for instance, be updated to include information indicating that the user of user computing device 302 requested to view and/or viewed the particular content item that was requested by user computing device 302. This information may, for instance, be used in selecting particular content and/or particular types of content to promote to the user of user computing device 302 in the future. For example, if the user of user computing device 302 requested video content in this instance, the request for video content may be reflected in the user history information for the user of user computing device 302, and as a result, information passport computing platform 310 may select other video content items for the user of user computing device 302 in the future. Additionally or alternatively, the user history information may be updated to reflect any changes in the user's information security score as a result of viewing and/or otherwise accessing the requested content. For example, if the requested content item was worth one or more points towards the information security score of the user of user computing device 302, information passport computing platform 310 may update the user history information to reflect the increase in the user's information security score. As seen in graphical user interface 600 of FIG. 6, the user's information security score may be included in the information passport dashboard interface, and after information passport computing platform 310 updates the user history information to reflect a change in the user's information security score, information passport computing platform 310 may cause the information security score displayed in the information passport dashboard interface to be updated as well (which in turn may, e.g., be reflected in the user interface presented by user computing device 302).

Referring again to FIG. 4D, at step 18, information passport computing platform 310 may update user preferences information. For example, at step 18, information passport computing platform 310 may update the user preferences information that is specific to the user of the user computing device based on the user history information. Such user preferences information may, for instance, be updated to include information indicating that the user of user computing device 302 requested to view and/or viewed the particular content item that was requested by user computing device 302. This information may, for instance, be used in selecting particular content and/or particular types of content to promote to the user of user computing device 302 in the future. For example, if the user of user computing device 302 requested video content in this instance, the request for video content may be reflected in the user preferences information for the user of user computing device 302, and as a result, information passport computing platform 310 may select other video content items for the user of user computing device 302 in the future. As another example, if the user of user computing device 302 requested written article content or video game content, such a request may likewise be reflected in the user preferences information for the user of user computing device 302, and information passport computing platform 310 may similarly use this information in selecting similar content items and/or similar types of content items for the user of user computing device 302 in the future, based on the user preferences information.

At step 19, information passport computing platform 310 may monitor user activity information. For example, at step 19, information passport computing platform 310 may monitor user activity information received from user computing device 302 (e.g., after the content information is sent to user computing device 302 at step 14 and/or after the content is presented by user computing device 302 at step 16). Such user activity information may, for instance, include information indicating whether the user of user computing device 302 completed one or more activities that were included in and/or otherwise associated with the content that was provided to user computing device 302 by information passport computing platform 310, how much time it took the user of user computing device 302 to complete such activities, what rating, if any, the user of user computing device 302 assigned to such activities, and/or other information associated with the user's completion of and/or interaction with the activities that were included in and/or otherwise associated with the content that was provided to user computing device 302 by information passport computing platform 310. As discussed in greater detail below, this user activity information may, for instance, be used by information passport computing platform 310 in the future in selecting content items for the user of user computing device 302 and/or in selecting content items for other users of other user computing devices, such as user computing device 304.

Referring to FIG. 4E, at step 20, information passport computing platform 310 may update aggregate usage information. For example, at step 20, information passport computing platform 310 may update the aggregate usage information based on the user activity information. In updating the aggregate usage information, information passport computing platform 310 may add to and/or otherwise modify the aggregate usage information to reflect the activity of the user of user computing device 302 as reflected by the user activity information. As a result, the user activity information may, for instance, affect how information passport computing platform 310 selects content items for the user of user computing device 302 and/or one or more other users of other user computing devices, such as user computing device 304. In some instances, in addition to recording information about the content items and/or activities that were selected and/or completed by the user of user computing device 302, information passport computing platform 310 also may record outcome information about how the user of user computing device 302 subsequently performed in relation to certain metrics after viewing particular content and/or completing a particular activity. For example, if the user of user computing device 302 goes a certain period of time without incurring a particular violation after viewing particular content, completing a particular activity, or taking a particular training course, this information may be recorded by information passport computing platform 310 and used by information passport computing platform 310 in promoting the particular content, activity, or training course to other users as a relatively effective content item, activity, or training course. In addition, information passport computing platform 310 may dynamically increase the point value of such a content item, activity, or training course based on determining that it is relatively effective, such that the content item, activity, or training course is worth additional points towards a particular user's information security score and so as to encourage and/or otherwise incentivize other users of other user computing devices to view and/or complete the particular content item, activity, or training course to earn these additional points, as discussed in greater detail below.

In some embodiments, the aggregate usage information may be further updated based on additional user activity information received from one or more other computing devices different from the user computing device. For example, in updating the aggregate usage information (e.g., at step 20), information passport computing platform 310 may update the aggregate usage information based on additional user activity information received from one or more other computing devices different from user computing device 302, such as additional user activity information received from user computing device 304 and/or one or more other user computing devices. In this way, trend data across various users of the information passport dashboard interface may be collected and used by information passport computing platform 310 in selecting content to be promoted to individual users. Such trend data may, for instance, indicate that certain users may prefer a particular content item and/or particular types of content items (e.g., written article content, media content, game content, and/or the like), and the preferences that may be derived from this trend data by information passport computing platform 310 may accordingly be used by information passport computing platform 310 in selecting content items.

In some embodiments, the information passport dashboard interface further may include a user information security score that is determined for the user of the user computing device based on user interaction with the information passport dashboard interface. For example, the information passport dashboard interface (which may, e.g., be generated by information passport computing platform 310 and provided to user computing device 302 for display) may include a user information security score that is determined by information passport computing platform 310 for the user of user computing device 302 based on the user's current and/or previous interactions with the information passport dashboard interface. As discussed above, for instance, the user of user computing device 302 may earn points that increase his or her information security score by viewing content, completing activities, and/or otherwise having positive interactions with the information passport dashboard interface. Additionally or alternatively, the user of user computing device 302 may have points deducted from his or her information security score as a result of incurring violations and/or having exceptions, as discussed in greater detail below.

In some embodiments, the user information security score may be further determined based on violation information for the user of the user computing device. For example, the user information security score for the user of user computing device 302 may be calculated and/or otherwise determined based on violation information for the user of user computing device 302. Such violation information may, for instance, include information indicating what violations, if any, the user of user computing device 302 has incurred, the point deductions corresponding to any such violations, and/or potential remedial actions that the user of user computing device 302 may take to remove the violations and/or the point deductions from his or her information security score.

In some embodiments, selecting the content items from the listing of available dashboard content items may include selecting at least one content item based on the violation information for the user of the user computing device. For example, in selecting the content items from the listing of available dashboard content items, information passport computing platform 310 may select at least one content item based on the violation information for the user of user computing device 302. For instance, information passport computing platform 310 may select a content item that, if viewed and/or completed by the user of user computing device 302, would allow the user to remove the violation and/or the point deduction corresponding to the violation from his or her information security score.

In some embodiments, at least one point value of the at least one content item may be dynamically modified to incentivize the user of the user computing device to view the at least one content item. For example, information passport computing platform 310 may dynamically modify the point value of the particular content item(s) that are selected based on the violation information for the user of user computing device 302 so as to incentivize the user of user computing device 302 to view and/or complete the particular content item(s). In this way, information passport computing platform 310 may encourage users of the information passport dashboard interface, such as the user of user computing device 302, to complete activities that are linked to their previous violations. In particular, information passport computing platform 310 may incentivize a user to complete a particular activity that may prevent the user from incurring similar violations in the future by increasing the point value of the activity or content item, which would allow the user to earn more points toward his or her information security score (e.g., two points, five points, ten points, and/or the like) instead of the standard amount of points that the activity or content item might normally be worth (e.g., one point, two points, and/or the like).

Figure 20:
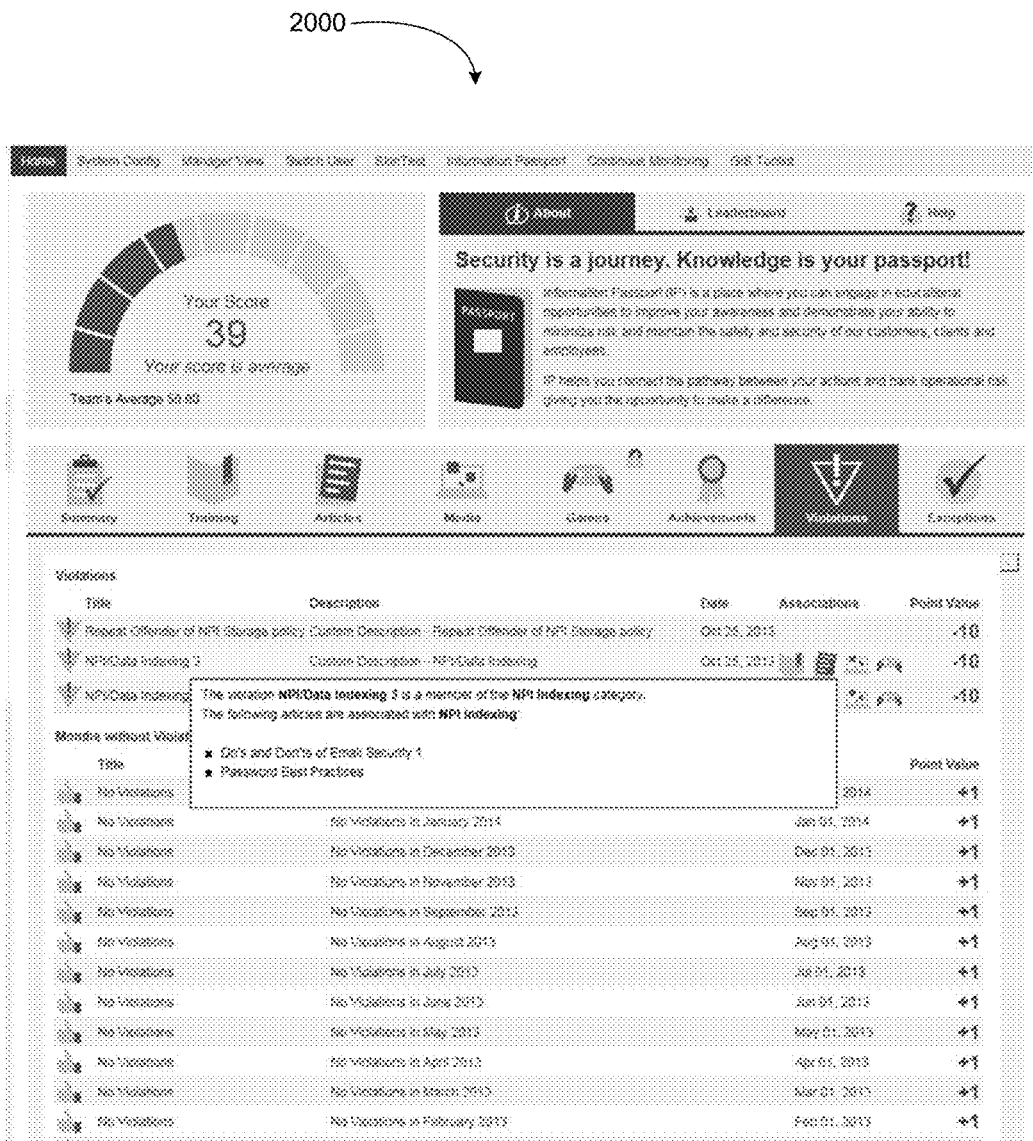
Figure 21:
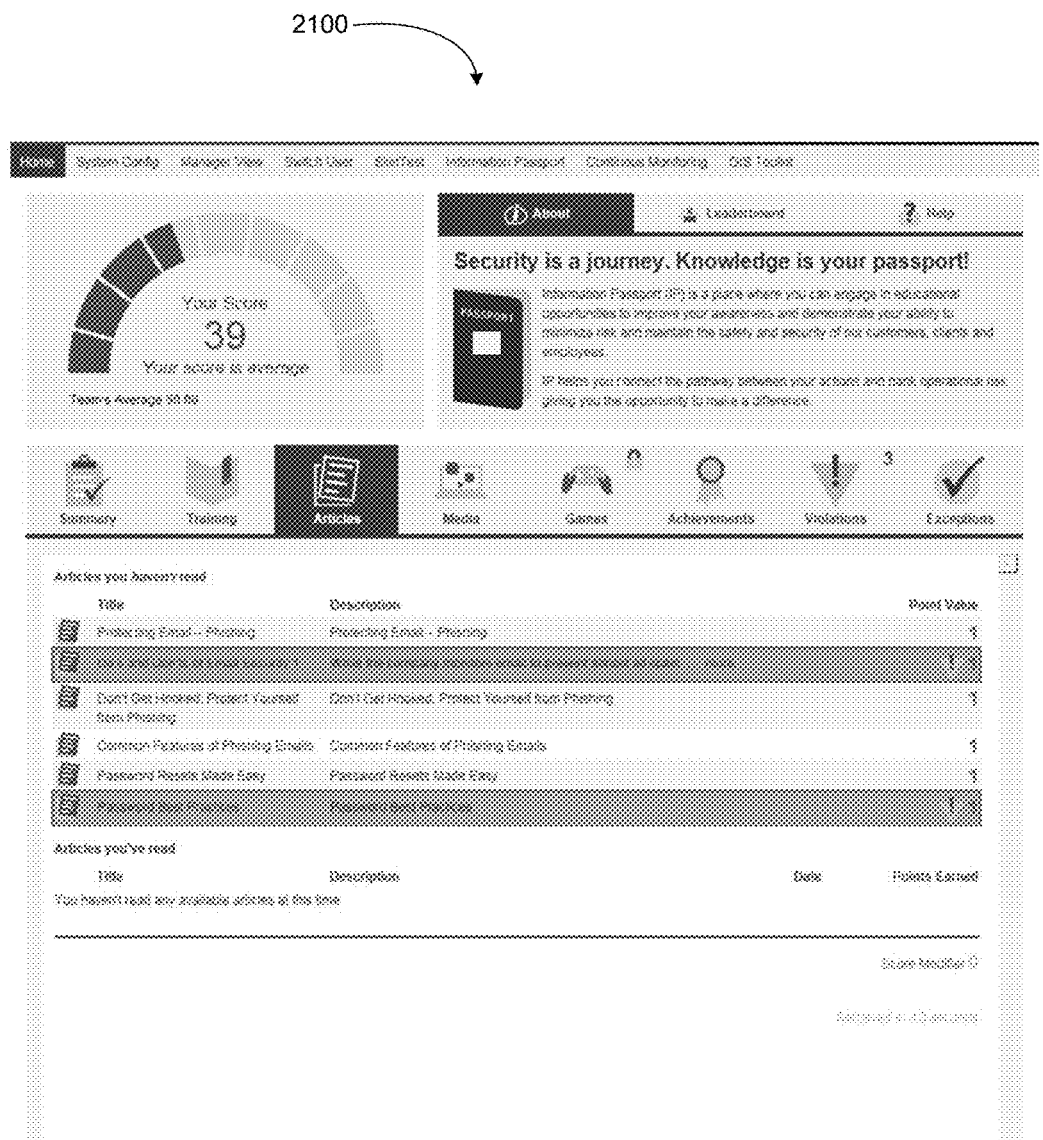
Figure 22:

In causing the user computing device to present graphical user interfaces that include an information security score and/or incentives for the user to complete particular activities linked to the user's violation information, information passport computing platform 310 may cause the user computing device (e.g., user computing device 302) to display and/or otherwise present one or more graphical user interfaces similar to the example user interfaces illustrated in FIGS. 20-22. For example, user computing device 302 may display, cause to be displayed, and/or otherwise present a graphical user interface similar to graphical user interface 2000, which is illustrated in FIG. 20. As seen in FIG. 20, graphical user interface 2000 may include text and/or other information identifying the user's current information security score, the user's previous violations, the impact of such violations on the user's information security score, and particular content items and/or activities that are associated with the user's previous violations (and which, e.g., may be completed to earn additional points towards the user's information security score to make up for the violations).

Additionally or alternatively, user computing device 302 may display, cause to be displayed, and/or otherwise present a graphical user interface similar to graphical user interface 2100, which is illustrated in FIG. 21. As seen in FIG. 21, graphical user interface 2100 may include text and/or other information identifying particular articles and/or other content that the user of user computing device 302 may view that may be related to the user's previous violations, as well as highlighting to distinguish these particular articles from other articles and/or content. Additionally or alternatively, user computing device 302 may display, cause to be displayed, and/or otherwise present a graphical user interface similar to graphical user interface 2200, which is illustrated in FIG. 22. As seen in FIG. 22, graphical user interface 2200 may include text and/or other information identifying particular media content and/or other content that the user of user computing device 302 may view that may be related to the user's previous violations, as well as highlighting to distinguish this particular media content from other content that may be available via the information passport dashboard interface.

In some embodiments, the user information security score may be further determined based on exception information for the user of the user computing device. For example, the user information security score for the user of user computing device 302 may be calculated and/or otherwise determined based on exception information for the user of user computing device 302. Such exception information may, for instance, include information indicating what exceptions, if any, the user of user computing device 302 may possess, the point deductions corresponding to any such exceptions, and/or potential remedial actions that the user of user computing device 302 may take to learn more about the exceptions and/or remove the point deductions from his or her information security score. A particular exception may, for instance, identify an exception to an established enterprise information security policy, such as a data loss prevention policy, that may be granted to the particular user (e.g., the user of user computing device 302). For example, the user of user computing device 302 may have an exception that has been granted by the organization operating information passport computing platform 310 and that allows the user to use a portable flash drive with his or her work computer, even though use of such a flash drive would otherwise be in violation of the organization's enterprise information security policies.

In some embodiments, selecting the content items from the listing of available dashboard content items may include selecting at least one content item based on the exception information for the user of the user computing device. For example, in selecting the content items from the listing of available dashboard content items, information passport computing platform 310 may select at least one content item based on the exception information for the user of user computing device 302. For instance, information passport computing platform 310 may select a content item that, if viewed and/or completed by the user of user computing device 302, would allow the user to remove the point deduction corresponding to his or her exceptions (which may, e.g., be specified in the exception information for the user of user computing device 302) from his or her information security score.

In some embodiments, at least one point value of the at least one content item may be dynamically modified to incentivize the user of the user computing device to view the at least one content item. For example, information passport computing platform 310 may dynamically modify the point value of the particular content item(s) that are selected based on the exception information for the user of user computing device 302 so as to incentivize the user of user computing device 302 to view and/or complete the particular content item(s). In this way, information passport computing platform 310 may encourage users of the information passport dashboard interface, such as the user of user computing device 302, to complete activities that are linked to their exceptions. In particular, information passport computing platform 310 may incentivize a user to complete a particular activity that may prevent the user from misusing the exception and/or may mitigate the risk associated with the exception by increasing the point value of the activity or content item, which would allow the user to earn more points toward his or her information security score (e.g., two points, five points, ten points, and/or the like) instead of the standard amount of points that the activity or content item might normally be worth (e.g., one point, two points, and/or the like).

Figure 17:
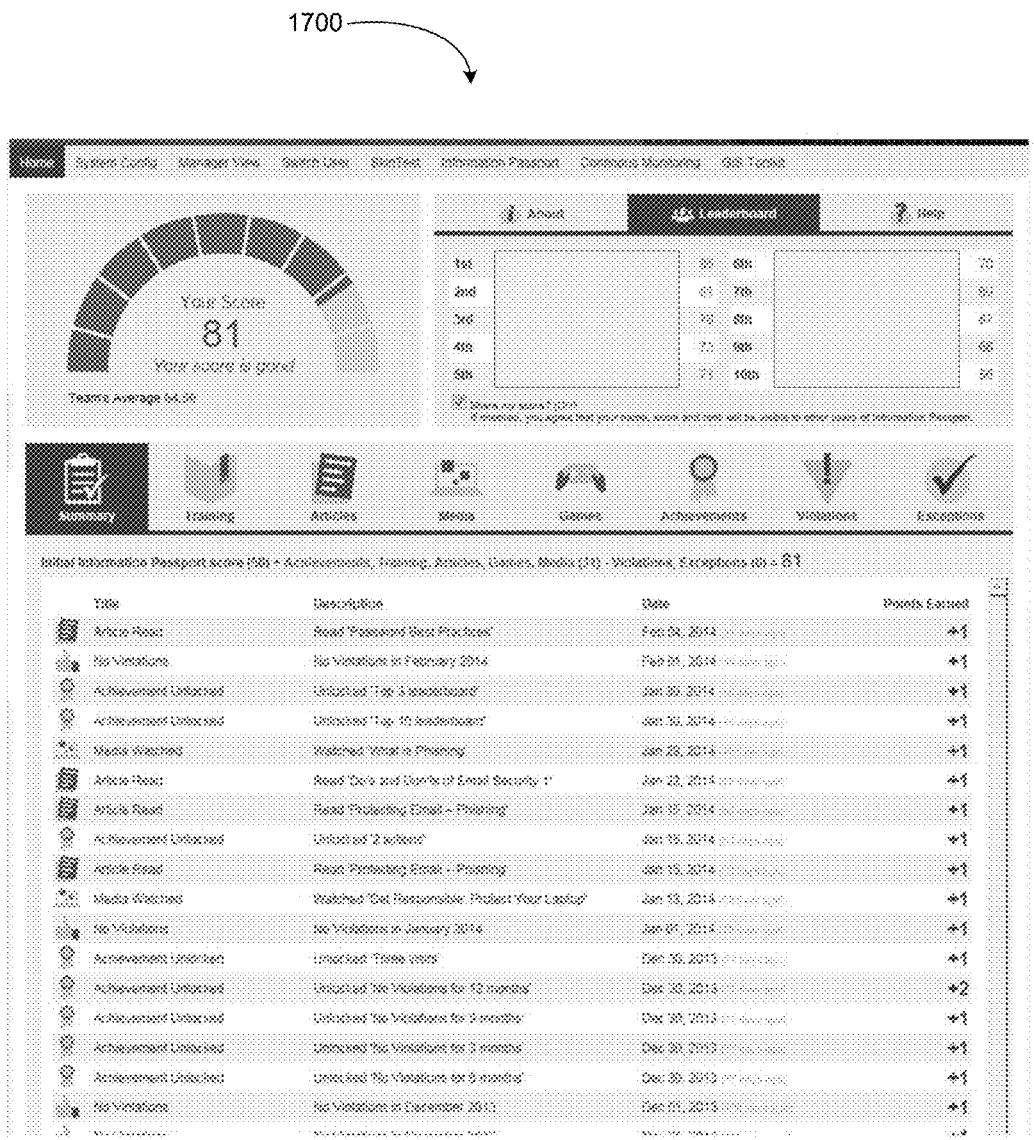
Figure 18:
Figure 19:

In some embodiments, the information passport dashboard interface may further include at least one leaderboard interface. For example, the information passport dashboard interface (which may, e.g., be generated by information passport computing platform 310 and provided to user computing device 302 for display to the user of user computing device 302) may include one or more leaderboard interfaces, which may be graphical user interfaces similar to the example user interfaces illustrated in FIGS. 17-19, and information passport computing platform 310 may cause one or more user computing devices, such as user computing device 302, to present such leaderboard interfaces. For example, user computing device 302 may display, cause to be displayed, and/or otherwise present a graphical user interface similar to graphical user interface 1700, which is illustrated in FIG. 17. As seen in FIG. 17, graphical user interface 1700 may include text and/or other information identifying the user's current information security score, the user's standing on a leaderboard in relation to other users of the information passport dashboard interface based on the user's current information security score, the information security scores of such other users, and/or other information associated with the leaderboard, such as an option to share or not share the user's information security score with other users for purposes of being included in the leaderboard. Additionally or alternatively, user computing device 302 may display, cause to be displayed, and/or otherwise present a graphical user interface similar to graphical user interface 1800, which is illustrated in FIG. 18. As seen in FIG. 18, graphical user interface 1800 may include text and/or other information indicating that the user of user computing device 302 has chosen to share his or her information security score with other users of the information passport dashboard interface for purposes of being included in the leaderboard. Additionally or alternatively, user computing device 302 may display, cause to be displayed, and/or otherwise present a graphical user interface similar to graphical user interface 1900, which is illustrated in FIG. 19. As seen in FIG. 19, graphical user interface 1900 may include text and/or other information indicating that the user of user computing device 302 has chosen not to share his or her information security score with other users of the information passport dashboard interface for purposes of opting out of being included in the leaderboard.

In some embodiments, the information passport dashboard interface may further include at least one violations interface. For example, the information passport dashboard interface (which may, e.g., be generated by information passport computing platform 310 and provided to user computing device 302 for display to the user of user computing device 302) may include one or more violations interfaces, which may be graphical user interfaces similar to the example user interfaces illustrated in FIGS. 20-22, and information passport computing platform 310 may cause one or more user computing devices, such as user computing device 302, to present such violations interfaces. For example, and as discussed above, user computing device 302 may display, cause to be displayed, and/or otherwise present one or more graphical user interfaces similar to graphical user interface 2000, which is illustrated in FIG. 20; graphical user interface 2100, which is illustrated in FIG. 21; and/or graphical user interface 2200, which is illustrated in FIG. 22.

In some embodiments, the information passport dashboard interface may further include at least one manager interface. For example, the information passport dashboard interface (which may, e.g., be generated by information passport computing platform 310 and provided to user computing device 302 for display to the user of user computing device 302) may include one or more manager interfaces, which may be graphical user interfaces similar to the example user interfaces illustrated in FIGS. 24-31, and information passport computing platform 310 may cause one or more user computing devices, such as user computing device 302, to present such manager interfaces. As discussed in greater detail below, the one or more manager user interfaces may include information about team scores, manager challenges (e.g., in which the manager of one team may challenge another team to complete a certain number of activities in the information passport dashboard interface and/or reach a certain information security score), and/or other information. Additionally or alternatively, the one or more manager interfaces may be presented on one or more manager computing devices, such as manager computing device 306 and/or manager computing device 308, rather than on one or more user computing devices, such as user computing device 302 and/or user computing device 304, as illustrated in the examples discussed below.

Referring again to FIG. 4E, at step 21, manager computing device 306 may receive a request for a manager dashboard. For example, at step 21, manager computing device 306 may receive input from a user of manager computing device 306 requesting to view and/or otherwise access one or more manager interfaces of the information passport dashboard interface. Such manager interfaces may, for example, be referred to as a "manager dashboard," and the user of manager computing device 306 may, for instance, be a manager within an organization, such as a financial institution, that utilizes information passport computing platform 310 to educate its employees about information security.

At step 22, manager computing device 306 may send a request for a manager dashboard to information passport computing platform 310. For example, based on receiving the request to view and/or otherwise access a manager dashboard from the user, manager computing device 306 may, at step 22, send a request to information passport computing platform 310 that requests one or more pages of and/or otherwise requests access to a manager dashboard that may be provided by information passport computing platform 310 (e.g., to various manager computing devices associated with an organization and/or to various users of such manager computing devices).

At step 23, information passport computing platform 310 may receive the request for the manager dashboard from manager computing device 306. For example, at step 23, information passport computing platform 310 may receive, via communication interface 320, and from manager computing device 306, a request for manager dashboard for a user of manager computing device 306.

Figure 4F:
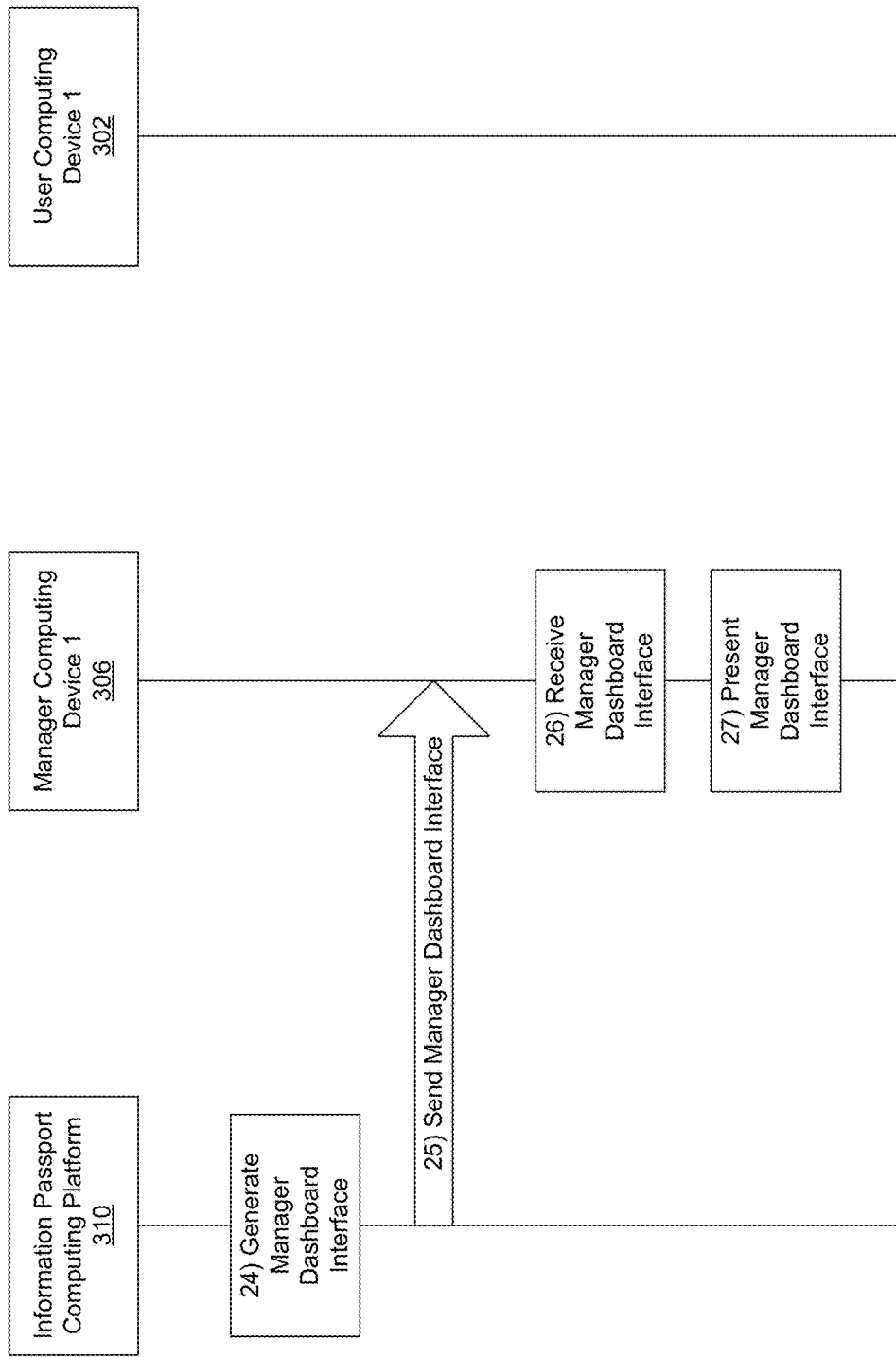

Referring to FIG. 4F, at step 24, information passport computing platform 310 may generate a manager dashboard interface. For example, at step 24, information passport computing platform 310 may generate, for the user of manager computing device 306, a manager dashboard interface that includes information about one or more users of the information passport dashboard interface, such as one or more users who may be team members that are managed by the user of manager computing device 306. Such a manager dashboard interface may include one or more graphical user interfaces similar to the example user interfaces illustrated in FIGS. 24-31, as discussed in greater detail below.

At step 25, information passport computing platform 310 may send the manager dashboard interface to manager computing device 306. For example, at step 27, information passport computing platform 310 may send, via communication interface 320, and to manager computing device 306, the manager dashboard interface. At step 26, manager computing device 306 may receive the manager dashboard interface from information passport computing platform 310. At step 27, manager computing device 306 may present the manager dashboard interface. For example, at step 27, manager computing device 306 may display, cause to be displayed, and/or otherwise present one or more graphical user interfaces that include the manager dashboard interface and/or content associated with the manager dashboard interface, such as one or more of the example user interfaces illustrated in FIGS. 24-31.

Figure 24:
Figure 25:
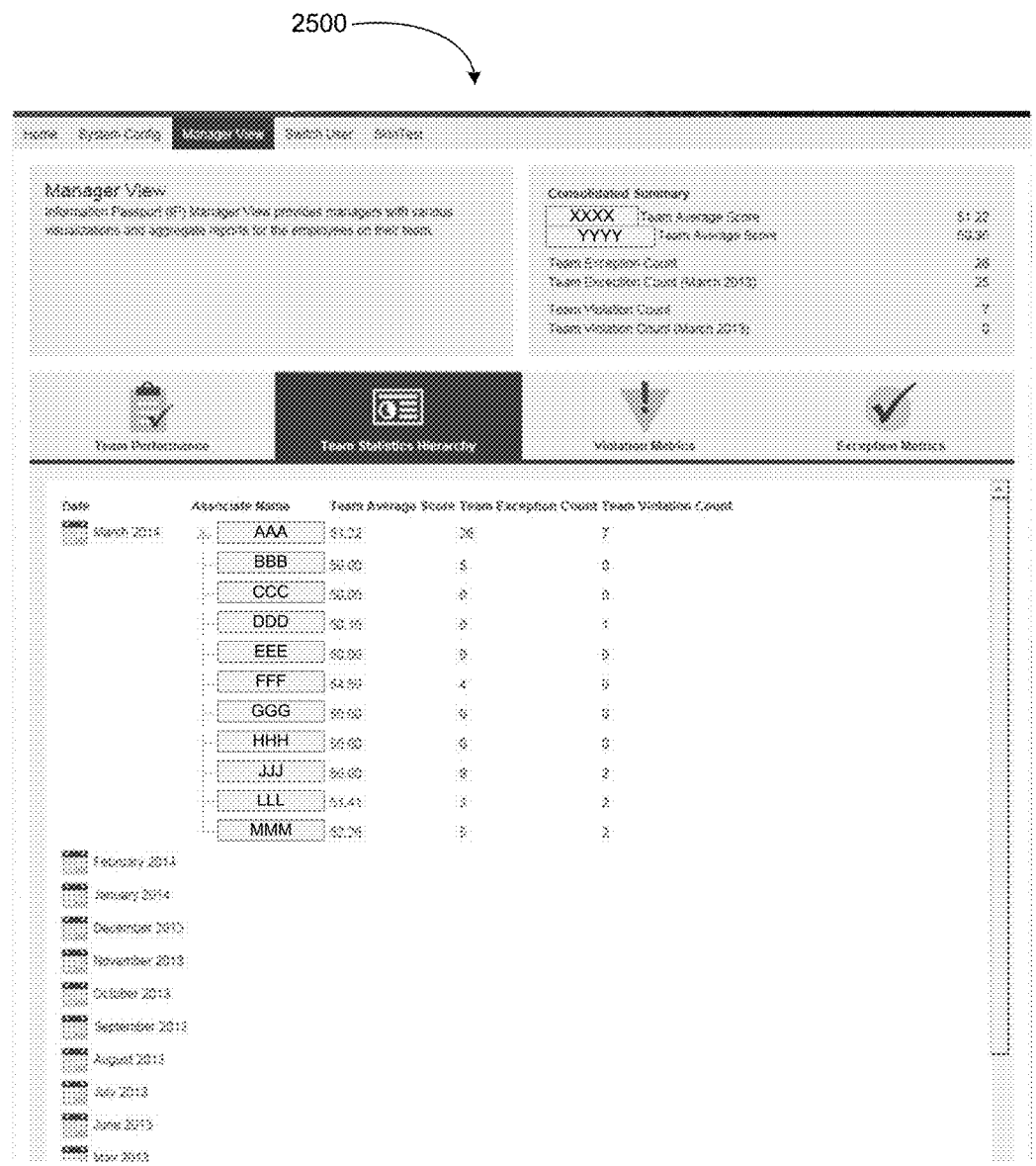
Figure 26:
Figure 27:
Figure 28:
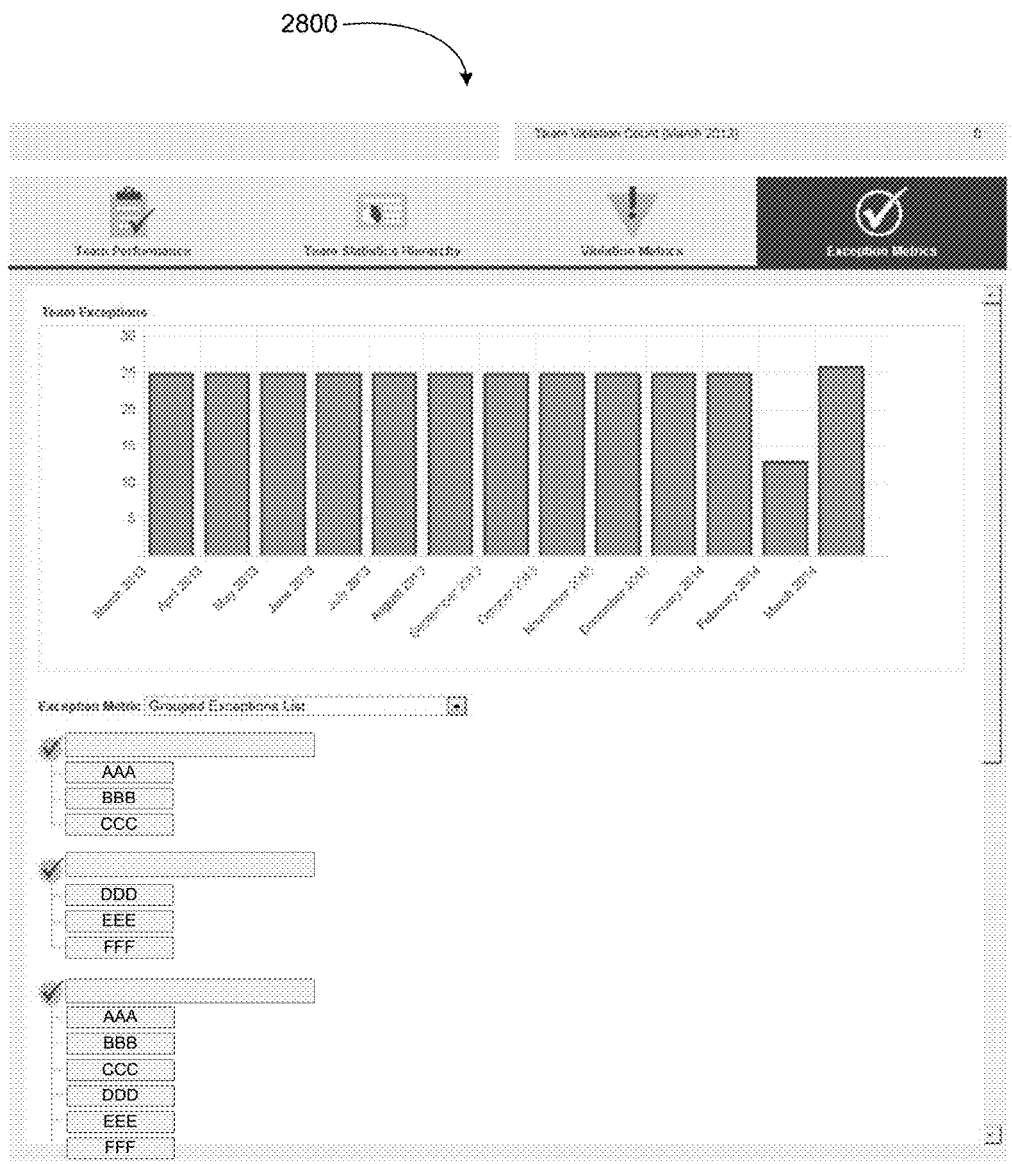

For example, manager computing device 306 may display, cause to be displayed, and/or otherwise present a graphical user interface similar to graphical user interface 2400, which is illustrated in FIG. 24. As seen in FIG. 24, graphical user interface 2400 may include text and/or other information providing an overview of team performance for the user of manager computing device 306, which may include a view of the average information security score for the manager's team, a view of the information security scores of individual team members on the manager's team, a leaderboard, and/or peer comparison information. Additionally or alternatively, manager computing device 306 may display, cause to be displayed, and/or otherwise present a graphical user interface similar to graphical user interface 2500, which is illustrated in FIG. 25. As seen in FIG. 25, graphical user interface 2500 may include text and/or other information providing a hierarchical view of team statistics for the user of manager computing device 306. Additionally or alternatively, manager computing device 306 may display, cause to be displayed, and/or otherwise present a graphical user interface similar to graphical user interface 2600, which is illustrated in FIG. 26. As seen in FIG. 26, graphical user interface 2600 may include text and/or other information providing violation metrics for the user of manager computing device 306, which may include a timeline view of violations incurred by the manager's team, a list of recent violations incurred by the manager's team, and/or other information associated with violations. Additionally or alternatively, manager computing device 306 may display, cause to be displayed, and/or otherwise present a graphical user interface similar to graphical user interface 2700, which is illustrated in FIG. 27. As seen in FIG. 27, graphical user interface 2700 may include text and/or other information providing exception metrics for the user of manager computing device 306, which may include a timeline view of exceptions associated with the manager's team as well as other information associated with exceptions, such as an individual exceptions list. Additionally or alternatively, manager computing device 306 may display, cause to be displayed, and/or otherwise present a graphical user interface similar to graphical user interface 2800, which is illustrated in FIG. 28. As seen in FIG. 28, graphical user interface 2800 may include text and/or other information providing exception metrics for the user of manager computing device 306, which may include a timeline view of exceptions associated with the manager's team as well as other information associated with exceptions, such as a grouped exceptions list.

Figure 30:
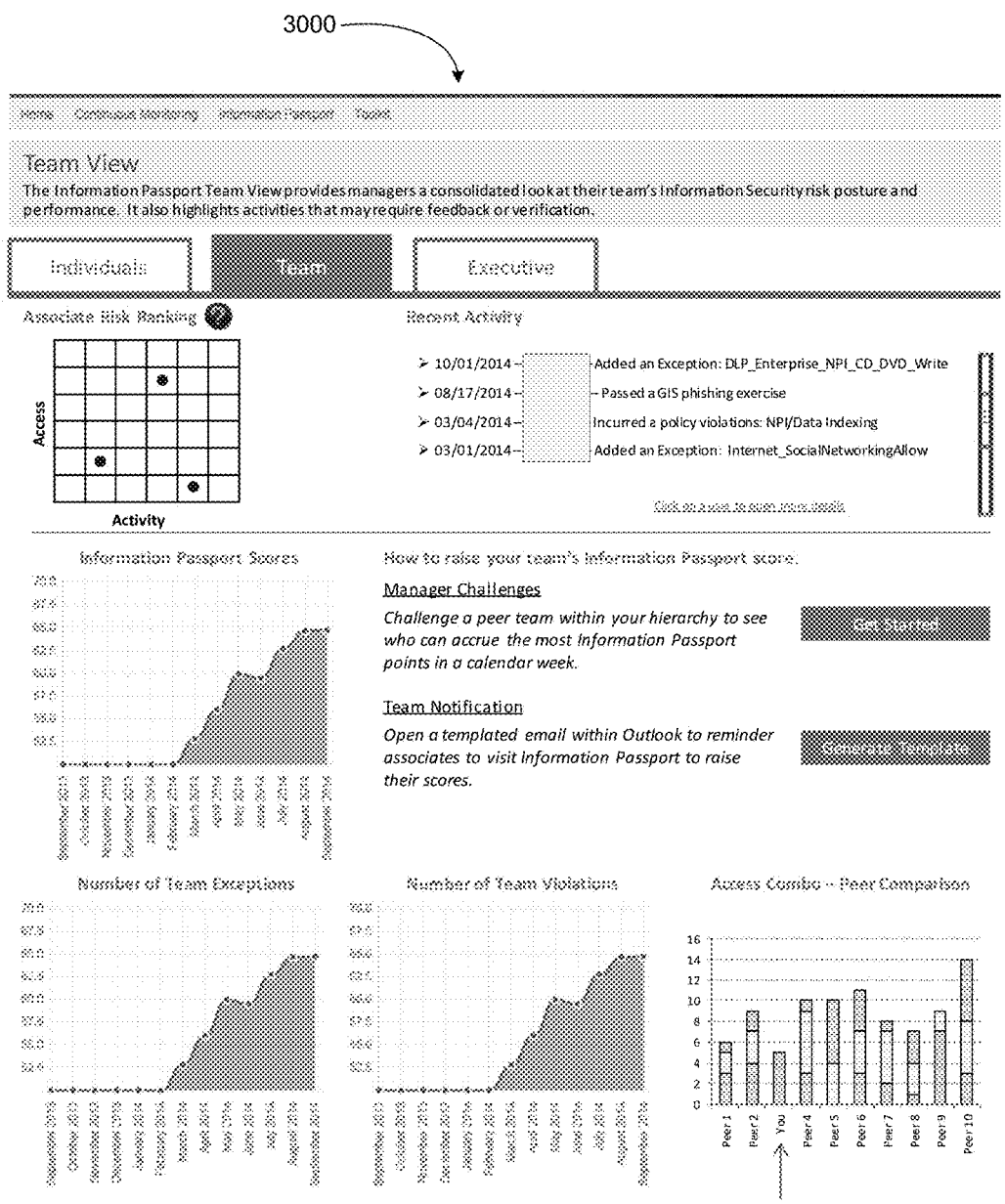
Figure 31:
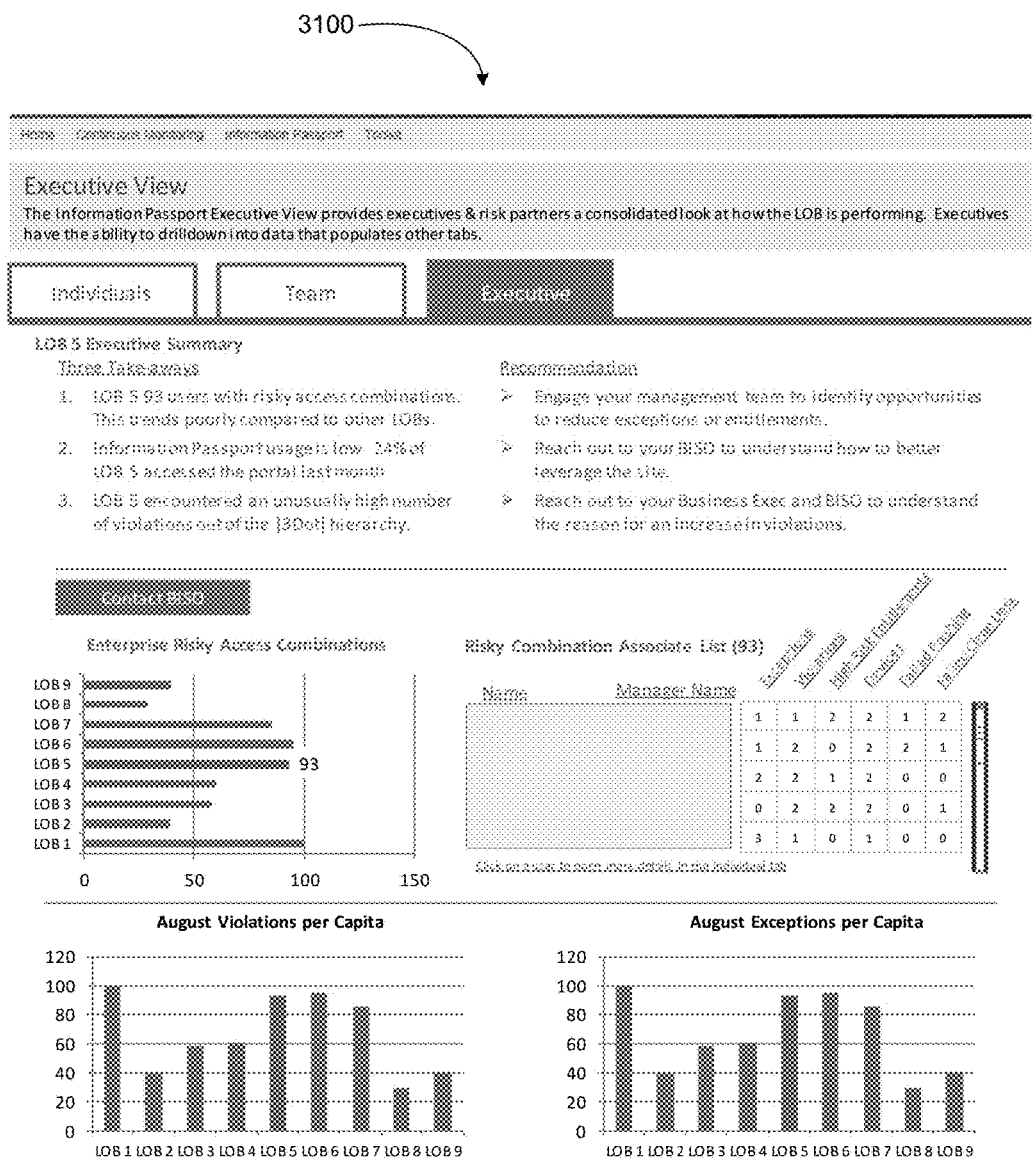

Additionally or alternatively, manager computing device 306 may display, cause to be displayed, and/or otherwise present a graphical user interface similar to graphical user interface 2900, which is illustrated in FIG. 29. As seen in FIG. 29, graphical user interface 2900 may include text and/or other information providing a view of individual-specific information security data for the user of manager computing device 306, which may include risk profile information for a particular individual on the manager's team, a heat map illustrating the individual's risk profile, and/or other information associated with the individual, such as the individuals violations and/or exceptions. Additionally or alternatively, manager computing device 306 may display, cause to be displayed, and/or otherwise present a graphical user interface similar to graphical user interface 3000, which is illustrated in FIG. 30. As seen in FIG. 30, graphical user interface 3000 may include text and/or other information providing a view of team-specific information security data for the user of manager computing device 306, which may include associate risk ranking information for the manager's team, a heat map illustrating this risk ranking information, recent information security activity for individuals on the manager's team, graphical views of various metrics, suggestions for improving information security with respect to the manager's team, and/or other information security information. Additionally or alternatively, manager computing device 306 may display, cause to be displayed, and/or otherwise present a graphical user interface similar to graphical user interface 3100, which is illustrated in FIG. 31. As seen in FIG. 31, graphical user interface 3100 may include text and/or other information providing a view of executive overview information for the user of manager computing device 306, which may include take-away information, recommendations for improving information security, metrics and/or graphical data providing an overview of current and/or previous information security levels for the organization, and/or other information security information.

Figure 32:
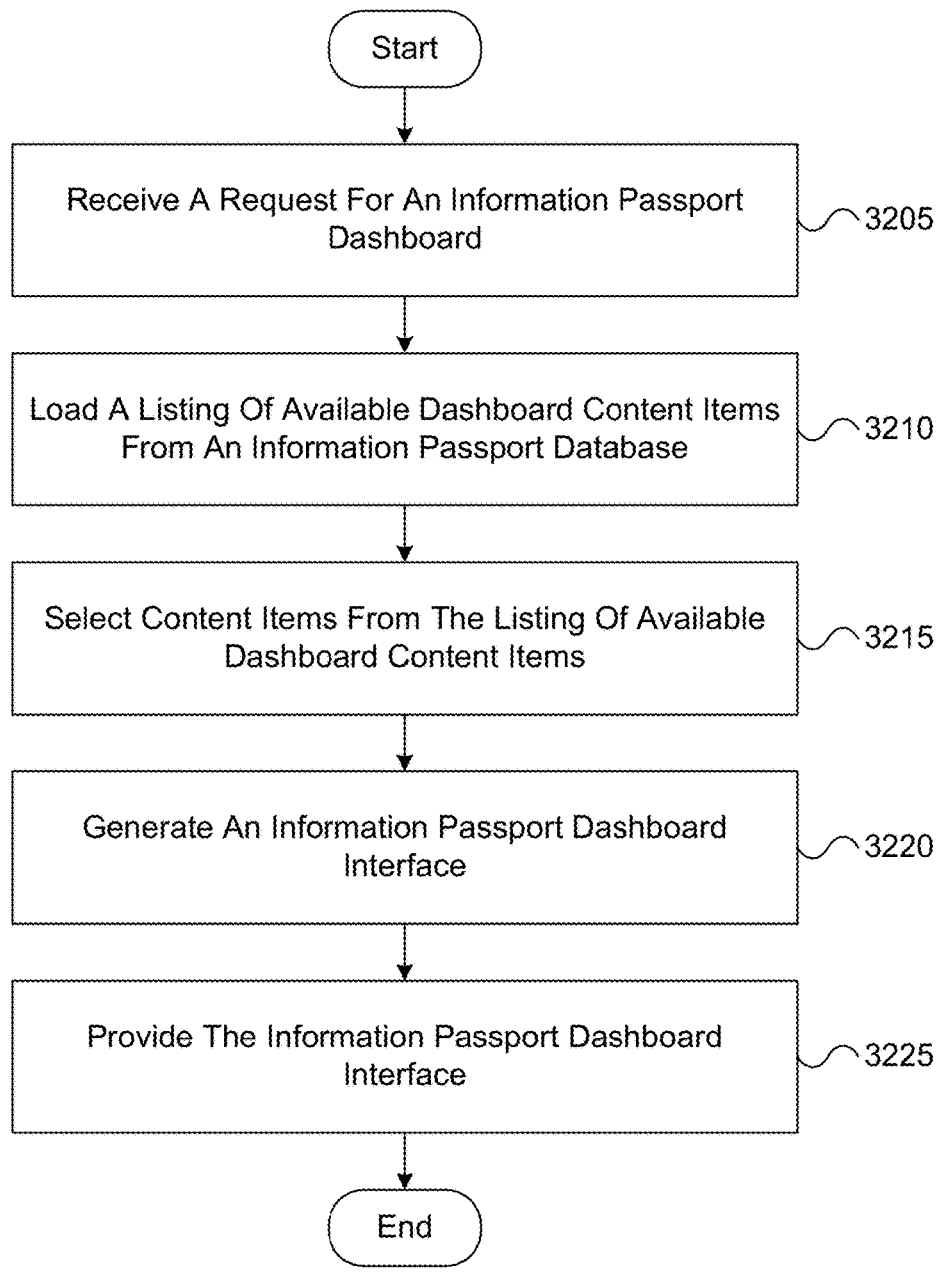
FIG. 32 depicts an illustrative method for enhancing information security using an information passport dashboard in accordance with one or more example embodiments.

FIG. 32 depicts an illustrative method for enhancing information security using an information passport dashboard in accordance with one or more example embodiments. Referring to FIG. 32, at step 3205, a computing platform may receive a request for an information passport dashboard from a computing device. At step 3210, the computing platform may load a listing of available dashboard content items from an information passport database. At step 3215, the computing platform may select one or more content items from the listing of available dashboard content items. At step 3220, the computing platform may generate an information passport dashboard interface based on the one or more content items selected from the listing of available dashboard content items. At step 3225, the computing platform may provide the information passport dashboard interface to the computing device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system, comprising:
   at least one processor;
   a communication interface communicatively coupled to the at least one processor; and
   memory storing computer-readable instructions that, when executed by the at least one processor, cause the system to:
      receive, via the communication interface, and from a user computing device, a request for an information passport dashboard for a user of the user computing device;
      establish, via the communication interface, a communications link with the user computing device;
      load a listing of available dashboard content items for the user of the user computing device from an information passport database;
      select content items from the listing of available dashboard content items for the user of the user computing device to promote one or more content items to the user of the user computing device based on user preferences information that is specific to the user of the user computing device and further based on aggregate usage information that is indicative of aggregate usage of content items included in the information passport database by one or more users different from the user of the user computing device;
      generate, for the user of the user computing device, an information passport dashboard interface that includes information identifying the content items selected from the listing of available dashboard content items for the user of the user computing device, wherein the information passport dashboard interface generated for the user of the user computing device comprises a user information security score that is determined for the user of the user computing device based on user interaction with the information passport dashboard interface and based on violation information for the user of the user computing device, the violation information indicating one or more violations of an organization's enterprise information security policy that the user of the user computing device has incurred, one or more point deductions corresponding to the one or more violations of the organization's enterprise information security policy, and one or more remedial actions that are performable by the user of the user computing device to remove the one or more point deductions; and
      while the communications link with the user computing device is established, send, via the communication interface, and to the user computing device, the information passport dashboard interface, wherein sending the information passport dashboard interface to the user computing device causes the user computing device to display the information passport dashboard interface,
      wherein selecting the content items from the listing of available dashboard content items includes selecting at least one content item based on the violation information for the user of the user computing device.

2. The system of claim 1, wherein selecting the content items from the listing of available dashboard content items includes matching demographic information for the user of the user computing device with demographic trend information identifying one or more preferred content types for at least two different user groups to determine at least one preferred content type for the user of the user computing device.

3. The system of claim 1, wherein the user preferences information identifies at least one preferred content type of the user of the user computing device.

4. The system of claim 1, wherein the memory stores additional computer-readable instructions that, when executed by the at least one processor, further cause the system to:
   receive, via the communication interface, and from the user computing device, a request to view a first content item;
   load content information for the first content item; and
   send, via the communication interface, and to the user computing device, the content information for the first content item.

5. The system of claim 4, wherein the memory stores additional computer-readable instructions that, when executed by the at least one processor, further cause the system to:
   store user history information based on the request to view the first content item received from the user computing device; and
   update the user preferences information that is specific to the user of the user computing device based on the user history information.

6. The system of claim 1, wherein the memory stores additional computer-readable instructions that, when executed by the at least one processor, further cause the system to:
   monitor user activity information received from the user computing device; and
   update the aggregate usage information based on the user activity information.

7. The system of claim 6, wherein the aggregate usage information is further updated based on additional user activity information received from one or more other computing devices different from the user computing device.

8. The system of claim 1, wherein at least one point value of the at least one content item is dynamically modified to incentivize the user of the user computing device to view the at least one content item.

9. The system of claim 1, wherein the user information security score is further determined based on exception information for the user of the user computing device.

10. The system of claim 9, wherein selecting the content items from the listing of available dashboard content items includes selecting at least one content item based on the exception information for the user of the user computing device.

11. The system of claim 10, wherein at least one point value of the at least one content item is dynamically modified to incentivize the user of the user computing device to view the at least one content item.

12. The system of claim 1, wherein the information passport dashboard interface further includes at least one leaderboard interface.

13. The system of claim 1, wherein the information passport dashboard interface further includes at least one violations interface.

14. The system of claim 1, wherein the information passport dashboard interface further includes at least one manager interface.

15. A method, comprising:
at a computing platform comprising at least one processor, memory, and a communication interface:
receiving, by the at least one processor, via the communication interface, and from a user computing device, a request for an information passport dashboard for a user of the user computing device;
establishing, by the at least one processor, via the communication interface, a communications link with the user computing device;
loading, by the at least one processor, a listing of available dashboard content items for the user of the user computing device from an information passport database;
selecting, by the at least one processor, content items from the listing of available dashboard content items for the user of the user computing device to promote one or more content items to the user of the user computing device based on user preferences information that is specific to the user of the user computing device and further based on aggregate usage information that is indicative of aggregate usage of content items included in the information passport database by one or more users different from the user of the user computing device;
generating, by the at least one processor, for the user of the user computing device, an information passport dashboard interface that includes information identifying the content items selected from the listing of available dashboard content items for the user of the user computing device, wherein the information passport dashboard interface generated for the user of the user computing device comprises a user information security score that is determined for the user of the user computing device based on user interaction with the information passport dashboard interface and based on violation information for the user of the user computing device, the violation information indicating one or more violations of an organization's enterprise information security policy that the user of the user computing device has incurred, one or more point deductions corresponding to the one or more violations of the organization's enterprise information security policy, and one or more remedial actions that are performable by the user of the user computing device to remove the one or more point deductions; and
while the communications link with the user computing device is established, sending, by the at least one processor, via the communication interface, and to the user computing device, the information passport dashboard interface, wherein sending the information passport dashboard interface to the user computing device causes the user computing device to display the information passport dashboard interface,
wherein selecting the content items from the listing of available dashboard content items includes selecting at least one content item based on the violation information for the user of the user computing device.

16. The method of claim 15, wherein selecting the content items from the listing of available dashboard content items includes matching demographic information for the user of the user computing device with demographic trend information identifying one or more preferred content types for at least two different user groups to determine at least one preferred content type for the user of the user computing device.

17. One or more non-transitory computer-readable media storing instructions that, when executed by a computing platform comprising at least one processor, memory, and a communication interface, cause the computing platform to:
receive, via the communication interface, and from a user computing device, a request for an information passport dashboard for a user of the user computing device;
establish, via the communication interface, a communications link with the user computing device:
load a listing of available dashboard content items for the user of the user computing device from an information passport database;
select content items from the listing of available dashboard content items for the user of the user computing device to promote one or more content items to the user of the user computing device based on user preferences information that is specific to the user of the user computing device and further based on aggregate usage information that is indicative of aggregate usage of content items included in the information passport database by one or more users different from the user of the user computing device;
generate, for the user of the user computing device, an information passport dashboard interface that includes information identifying the content items selected from the listing of available dashboard content items for the user of the user computing device, wherein the information passport dashboard interface generated for the user of the user computing device comprises a user information security score that is determined for the user of the user computing device based on user interaction with the information passport dashboard interface and based on violation information for the user of the user computing device, the violation information indicating one or more violations of an organization's enterprise information security policy that the user of the user computing device has incurred, one or more point deductions corresponding to the one or more violations of the organization's enterprise information security policy, and one or more remedial actions that are performable by the user of the user computing device to remove the one or more point deductions; and
while the communications link with the user computing device is established, send, via the communication interface, and to the user computing device, the information passport dashboard interface, wherein sending the information passport dashboard interface to the user computing device causes the user computing device to display the information passport dashboard interface,
wherein selecting the content items from the listing of available dashboard content items includes selecting at least one content item based on the violation information for the user of the user computing device.

* * * * *